(12) United States Patent
Hardy et al.

(10) Patent No.: US 11,403,933 B2
(45) Date of Patent: Aug. 2, 2022

(54) SYSTEMS AND METHODS FOR IMPLEMENTING AND USING A PROXIMITY DASHBOARD

(71) Applicant: TELEPERFORMANCE SE, Paris (FR)

(72) Inventors: Lyle Hardy, Holladay, UT (US); Evan Davis, Santaquin, UT (US)

(73) Assignee: TELEPERFORMANCE SE, Paris (FR)

( * ) Notice: Subject to any disclaimer, the term of this patent is extended or adjusted under 35 U.S.C. 154(b) by 36 days.

(21) Appl. No.: 16/848,628

(22) Filed: Apr. 14, 2020

(65) Prior Publication Data

US 2020/0357258 A1    Nov. 12, 2020

Related U.S. Application Data

(60) Provisional application No. 62/844,037, filed on May 6, 2019.

(51) Int. Cl.
| | | |
|---|---|---|
| *G08B 21/18* | (2006.01) | |
| *G06F 11/30* | (2006.01) | |
| *G06F 11/32* | (2006.01) | |
| *G08B 5/36* | (2006.01) | |
| *G06Q 30/00* | (2012.01) | |

(52) U.S. Cl.
CPC .......... *G08B 21/18* (2013.01); *G06F 11/3013* (2013.01); *G06F 11/3055* (2013.01); *G06F 11/325* (2013.01); *G06F 11/328* (2013.01); *G08B 5/36* (2013.01); *G06Q 30/016* (2013.01)

(58) Field of Classification Search
None
See application file for complete search history.

(56) References Cited

U.S. PATENT DOCUMENTS

| | | | | |
|---|---|---|---|---|
| 4,392,132 A | * | 7/1983 | Derks | G08B 25/10 340/3.7 |
| 5,519,572 A | * | 5/1996 | Luo | G06F 1/181 360/99.18 |
| 7,598,928 B1 | * | 10/2009 | Buskop | H04N 7/163 345/7 |
| 8,126,136 B2 | * | 2/2012 | Tong | H04M 3/5175 379/265.06 |

(Continued)

*Primary Examiner* — Chico A Foxx

(57) ABSTRACT

In various embodiments, an electronic device includes an electrical and physical interface operable to be coupled to a port of a computer system that includes a processor. The electronic device also includes a casing housing the interface. In addition, the electronic device includes a circuit board including circuitry housed within the casing. The circuitry receives control signals from the computer system over the interface and controls an illumination element. The illumination element is disposed on the casing and is operable to produce a color that corresponds to a real-time status associated with the computer system. The real-time status is determined by the processor and information read by the processor from the computer system. Moreover, the electronic device includes a beacon technology system housed within the casing. The beacon technology system is operable to communicate with a beacon technology system externally located to the electronic device. The beacon technology system is operable to trigger an automatic process when detected.

20 Claims, 21 Drawing Sheets

(56) References Cited

U.S. PATENT DOCUMENTS

| | | | | |
|---|---|---|---|---|
| 8,699,698 B2* | 4/2014 | Fagundes | H04M 3/5158 | |
| | | | 379/266.01 | |
| 9,031,222 B2* | 5/2015 | Wolfeld | H04M 3/51 | |
| | | | 379/265.03 | |
| 9,160,852 B2* | 10/2015 | Ripa | H04M 3/5133 | |
| 9,178,999 B1* | 11/2015 | Hegde | H04M 3/5232 | |
| 9,208,465 B2* | 12/2015 | Grasso | G06Q 10/06398 | |
| 9,656,120 B1* | 5/2017 | Franco | A63B 71/0622 | |
| 10,306,055 B1* | 5/2019 | Mammen | G10L 15/26 | |
| 10,872,160 B2* | 12/2020 | AthuluruTlrumala | H04W 4/50 | |
| 10,917,524 B1* | 2/2021 | Curtin | H04M 3/5175 | |
| 2005/0021369 A1* | 1/2005 | Cohen | H04L 67/306 | |
| | | | 455/73 | |
| 2008/0320042 A1* | 12/2008 | Arnold | G06F 16/685 | |
| 2010/0246800 A1* | 9/2010 | Geppert | H04W 4/21 | |
| | | | 379/265.09 | |
| 2010/0269072 A1* | 10/2010 | Sakata | G06F 3/017 | |
| | | | 715/863 | |
| 2012/0069986 A1* | 3/2012 | Edholm | H04M 3/2281 | |
| | | | 379/265.06 | |
| 2012/0321059 A1* | 12/2012 | O'Connor | H04N 7/141 | |
| | | | 379/93.21 | |
| 2013/0016115 A1* | 1/2013 | Minert | H04N 7/167 | |
| | | | 345/589 | |
| 2013/0039483 A1* | 2/2013 | Wolfeld | H04M 3/51 | |
| | | | 379/265.03 | |
| 2013/0050199 A1* | 2/2013 | Chavez | G06Q 10/101 | |
| | | | 345/419 | |
| 2013/0127904 A1* | 5/2013 | Dove | G01K 1/024 | |
| | | | 345/629 | |
| 2013/0176413 A1* | 7/2013 | Lowry | H04M 3/5175 | |
| | | | 348/77 | |
| 2013/0266133 A1* | 10/2013 | Paugam | G06Q 10/10 | |
| | | | 379/265.06 | |
| 2013/0279759 A1* | 10/2013 | Kagarlitsky | G06K 9/6202 | |
| | | | 382/105 | |
| 2014/0058721 A1* | 2/2014 | Becerra | G06F 40/30 | |
| | | | 704/9 | |
| 2014/0140497 A1* | 5/2014 | Ripa | H04M 3/5133 | |
| | | | 379/265.06 | |
| 2014/0323155 A1* | 10/2014 | Hewitt | H04W 4/023 | |
| | | | 455/456.3 | |
| 2014/0376711 A1* | 12/2014 | Thomson | H04M 3/5175 | |
| | | | 379/265.06 | |
| 2014/0379587 A1* | 12/2014 | Thomson | H04M 3/51 | |
| | | | 705/304 | |
| 2015/0178371 A1* | 6/2015 | Seth | G06F 16/3329 | |
| | | | 707/748 | |
| 2016/0065629 A1* | 3/2016 | Emoff | H04L 65/403 | |
| | | | 715/753 | |
| 2016/0189164 A1* | 6/2016 | Tolksdorf | G06Q 30/016 | |
| | | | 705/304 | |
| 2016/0241713 A1* | 8/2016 | Alm | H04M 3/5183 | |
| 2016/0323708 A1* | 11/2016 | Sahadi | H04W 4/023 | |
| 2016/0345076 A1* | 11/2016 | Makhlouf | H04N 21/44222 | |
| 2017/0092034 A1* | 3/2017 | Want | G06Q 20/0457 | |
| 2017/0138742 A1* | 5/2017 | Teicher | G01S 1/68 | |
| 2017/0163725 A1* | 6/2017 | Chadaga | G06F 1/1637 | |
| 2017/0244998 A1* | 8/2017 | Shaw | H04N 21/43615 | |
| 2018/0033244 A1* | 2/2018 | Northrup | H04L 67/22 | |
| 2018/0124242 A1* | 5/2018 | Zimmerman | G06F 40/35 | |
| 2018/0159978 A1* | 6/2018 | Gupta | H04M 3/5141 | |
| 2018/0225874 A1* | 8/2018 | Page | G06F 1/163 | |
| 2019/0058793 A1* | 2/2019 | Konig | H04M 3/5183 | |
| 2019/0164393 A1* | 5/2019 | Saeki | G08B 5/36 | |
| 2019/0266611 A1* | 8/2019 | de Sousa Moura | G06Q 30/016 | |
| 2020/0065390 A1* | 2/2020 | Cordell | G10L 15/005 | |
| 2020/0099790 A1* | 3/2020 | Ma | G06Q 30/016 | |
| 2020/0329190 A1* | 10/2020 | Nagahiro | H04N 5/23203 | |
| 2020/0344446 A1* | 10/2020 | Goodrich | H04N 7/147 | |

* cited by examiner

| Status 405 | Color 410 | Effect 415 |
|---|---|---|
| Hand Raised | Red | Solid |
| Help Coming | Yellow | Solid |
| Problem Solved | - | Turn Off |
| Station Available | Green | Solid |
| Station Occupied | - | Turn Off |
| Station Locked | Green | Blink |

| Status 605 | Condition 610 | Effect 615 |
|---|---|---|
| Number of Calls Handled | Most Calls Handled | Orange Strobe |
| Call Resolution | First Agent to Resolve a Call | Rainbow Gradient |
| Customer Satisfaction | Highest Rating | Blue Strobe |

1700

1704

1702

SYSTEMS AND METHODS FOR IMPLEMENTING AND USING A PROXIMITY DASHBOARD

CROSS-REFERENCE TO RELATED APPLICATIONS

This application claims the benefit of U.S. Provisional Patent Application No. 62/844,037 filed on May 6, 2019 entitled, "Systems and Methods for Implementing and Using a Proximity Dashboard," by Lyle Hardy et al., which is hereby incorporated by reference.

BACKGROUND

Customer contact centers or service centers typically employ a relatively large number of employees (agents) working in a common area or floor overseen by a floor manager or supervisor. The agents select an available workstation at which to work for receiving customer inquiries and for assisting the customers to solve the inquiries by phone, email, or electronic chat, for example. In some cases it may be difficult for an agent to determine which stations are available or which stations are occupied by agents that are temporarily away from the station, such as when an employee is taking a short break. Once the agent is working at a station, if the agent is having difficulty in assisting the customer to solve the customer's inquiry, the agent will stand up and raise their hand to indicate that they need assistance from the floor supervisor. The status of an agent that is requesting assistance is often referred to as a "hand raised". In the best-case scenario, the floor supervisor quickly responds to the agent's request for assistance, but often times several agents require assistance in a short time frame, and an agent may have to wait five or more minutes before they begin to receive assistance.

The requirement for an agent to physically stand up and raise their hand to receive assistance is often inefficient because the agent must stop working and cannot access or reference a knowledgebase, product manual, customer account, etc., while they wait to receive assistance. Moreover, the floor supervisor may have difficulty determining the order in which the agents requested assistance, or how long an agent has been waiting for assistance, etc., and determining which agent should receive assistance next. Furthermore, a floor supervisor may have to access a software program to determine information (e.g., metrics) related to agent status or performance, for example, which takes the supervisor's attention away from observing the agents on the floor in real-time.

What is needed is a method and device that enables a supervisor to easily obtain information pertaining to the agents working on a contact center floor at-a-glance so that the supervisor can efficiently manage the agents of the contact center.

SUMMARY

Various embodiments of the present disclosure provide systems and methods for automatically controlling an electronic illumination device to indicate information pertaining to workstations or agents of a customer contact center. Embodiments of the present disclosure are useful in the context of employee management because the electronic illumination device is used to indicate information about tasks that employees are engaged in, the performance of the employees, and the status of the employees. A computer system coupled to the electronic illumination device executes control software configured to send control signals over a communication interface, such as USB or Bluetooth. The data sent to the illumination device can cause the illumination device to turn off or on, change color, blink, strobe, etc., for producing desired visual effect representative of a status or event associated with an employee or workstation. By scanning across the contact center floor, the supervisor can obtain a rapid visual inspection of the types of questions, assistances, or status that are applicable to the agents on the floor.

According to one embodiment, an electronic device including an electrical and physical interface operable to be coupled to a port of a computer system is disclosed, where the computer system includes a processor. The electronic device also includes a casing housing the interface, a circuit board including circuitry housed within the casing, where the circuitry receives control signals from the computer system over the interface and controls an illumination element, and the illumination element disposed on the casing and operable to produce a color that corresponds to a real-time status associated with the computer system, where the real-time status is determined by the processor and information read by the processor from the computer system.

According to some embodiments the computer system receives an information request from a remote monitor over a network interface, where the computer system obtains the real-time status responsive to the information request, and where further the circuitry controls the illumination element responsive to the information request.

According to some embodiments the computer system receives a light configuration from the remote monitor, and where the computer system sends control signals to the circuitry to control the illumination element based on the light configuration.

According to some embodiments the light configuration includes at least one of a status threshold and a performance threshold.

According to some embodiments the real-time status represents a time duration of an agent logged into the computer system.

According to some embodiments the real-time status represents an agent requesting assistance.

According to some embodiments the real-time status represents a working time of an agent using the computer system.

According to some embodiments the real-time status represents an agent using the computer system, and where the agent is logged in to the computer system but not working on the computer system.

According to some embodiments the real-time status represents a software program executed by the computer system.

According to some embodiments the illumination element rapidly changes the color to produce a lighting effect corresponding to the real-time status.

According to another embodiment, a method of monitoring contact center status among a plurality of agents of a contact center is disclosed. The method includes a remote monitor sending an information request to agent computer systems of the contact center, where the contact center includes the plurality of agents, and where the agent computer systems include a processor, a communication port, and an electronic illumination device, responsive to receiving the information request, the agent computer systems of the plurality of agents determining real-time status information, and electronic illumination devices of the agent computer systems illuminating respective colors representative of respective real-time status information determined by the associated agent computer systems. Each electronic illumination device includes an electrical and physical interface operable to be coupled to a communication port of the associated agent computer system, a casing housing the electrical and physical interface, a circuit board including circuitry housed within the casing, where the circuitry receives control signals from the associated agent computer system over the interface and controls an illumination element, and the illumination element disposed on the casing and operable to produce the respective colors representative of the real-time status information, where the real-time status information is determined by the processor and information read by the processor from the agent computer systems.

According to some embodiments the real-time status information includes tasks currently performed by each agent.

According to some embodiments the real-time status information includes an identity of a first agent, where the first agent has a highest performance level based on a prescribed metric.

According to some embodiments the real-time status information includes productivity information for the agents.

According to a different embodiment, a method of monitoring contact center status among a plurality of agents is disclosed. The method includes determining real-time status of agent computer systems associated with the plurality of agents, where the agent computer systems include a processor and a communication port, and based on the real-time status read from a light configuration to determine lighting effects that correspond to the real-time status, causing electronic illumination devices associated with the agent computer systems to produce the lighting effects reflective of the real-time status, where each electronic illumination device includes an electrical and physical interface operable to be coupled to a communication port of an agent computer system, a casing housing the interface, a circuit board including circuitry housed within the casing, where the circuitry receives control signals from the agent computer system over the interface and controls an illumination element, where the illumination element is disposed on the casing and operable to produce lighting effects that correspond to the real-time statuses associated with the agent computer system.

According to some embodiments the real-time statuses indicate if a respective agent has requested assistance.

According to some embodiments the method includes the electronic devices illuminating a new color when a respective agent no longer requires assistance.

According to some embodiments the agent computer systems further include a network interface, and further includes the agent computer systems sending the real-time statuses to a remote monitor system using the network interface.

According to some embodiments the remote monitor selects a first agent of the plurality of agents to receive assistance.

According to some embodiments a respective electronic illumination device associated with the first agent changes color responsive to being selected by the supervisor computer system.

According to some embodiments, an electronic device includes an electrical and physical interface operable to be coupled to a port of a computer system that includes a processor. The electronic device also includes a casing housing the interface. In addition, the electronic device includes a circuit board including circuitry housed within the casing. The circuitry receives control signals from the computer system over the interface and controls an illumination element. The illumination element is disposed on the casing and is operable to produce a color that corresponds to a real-time status associated with the computer system. The real-time status is determined by the processor and information read by the processor from the computer system. Moreover, the electronic device includes a beacon technology system housed within the casing. The beacon technology system is operable to communicate with a beacon technology system externally located to the electronic device. The beacon technology system is operable to trigger an automatic process when detected.

According to some embodiments the beacon technology system includes Bluetooth Beacon technology.

According to some embodiments the beacon technology system externally located to the electronic device is housed within a second electronic device including a processor and a memory device coupled to the processor.

According to some embodiments the second electronic device includes a tablet computing device.

According to some embodiments the second electronic device includes a smartphone computing device.

According to some embodiments the automatic process is performed by the second electronic device.

According to some embodiments the real-time status represents a characteristic of an agent using the computer system.

According to some embodiments, a method of automatically retrieving information among a supervisor and a plurality of agents is disclosed. The supervisor is associated therewith a supervisor computer system including a beacon technology system and wherein each agent has associated therewith an agent computer system and an electronic device. The electronic device includes an electrical and physical interface operable to be coupled to a port of the agent computer system. The agent computer system includes a processor. The electronic device also includes a casing housing the interface, a circuit board including circuitry housed within the casing. The circuitry receives control signals from the agent computer system over the interface and controls an illumination element. The illumination element is disposed on the casing and is operable to produce a color that corresponds to a real-time status associated with the agent computer system. The real-time status is determined by the processor of the agent computer system and information read by the processor from the agent computer system. The electronic device also includes a beacon technology system housed within the casing. The beacon technology system is operable to communicate with the beacon technology system of the supervisor computer system. The method includes the supervisor computer system displaying its location in relation to a layout of a contact center. In addition, the method includes the supervisor computer system utilizing the beacon technology system to communicate with any electronic devices respectively coupled to the agent computer systems that are in proximity of detection by the beacon technology system of the supervisor computer system. The method also includes if any electronic devices respectively are detected in proximity to the supervisor computer system, the supervisor computer system displaying details of the agents associated with each of the detected electronic devices.

According to some embodiments the beacon technology system includes Bluetooth Beacon technology.

According to some embodiments the supervisor computer system includes a processor and a memory device coupled to the processor.

According to some embodiments the displaying details of the agents associated with each of the detected electronic devices includes ranking the agents based on proximity signal strength of their corresponding detected electronic devices.

According to some embodiments the supervisor computer system comprises a tablet computing device.

According to some embodiments the supervisor computer system comprises a smartphone computing device.

According to some embodiments the displaying details includes displaying a graphic user interface of details of the agents associated with each of the detected electronic devices.

According to some embodiments, a method of automatically outputting contact center data from a portable computer system to a proximity enabled display device is disclosed. The portable computer system and the proximity enabled display device each includes a beacon technology system and each is operable to communicate wirelessly. The portable computer system includes a processor and a memory device coupled to the processor. The method includes the portable computer system utilizing its beacon technology system to communicate with the proximity enabled display device when in proximity of detection by the beacon technology system of the proximity enabled display device. The method also includes if the proximity enabled display device is detected in proximity to the portable computer system, the portable computer system automatically outputs the contact center data to the proximity enabled display device. Furthermore, the method includes the proximity enabled display device receiving the contact center data from the portable computer system and displaying a graphical user interface comprising at least a portion of the received contact center data.

According to some embodiments the contact center data includes statistics associated with a plurality of agents of the contact center.

According to some embodiments the contact center data includes daily sales of a plurality of agents of the contact center.

According to some embodiments the portable computer system includes a tablet computing device.

According to some embodiments the portable computer system includes a smartphone computing device.

According to some embodiments the beacon technology system includes Bluetooth Beacon technology.

While various embodiments in accordance with the present disclosure have been specifically described within this Summary, it is noted that the claimed subject matter are not limited in any way by these various embodiments.

BRIEF DESCRIPTION OF THE DRAWINGS

The accompanying drawings, which are incorporated in and form a part of this specification, illustrate various embodiments of the present disclosure and, together with the description, serve to explain various principles of the present disclosure.

DETAILED DESCRIPTION

Figure 1A:
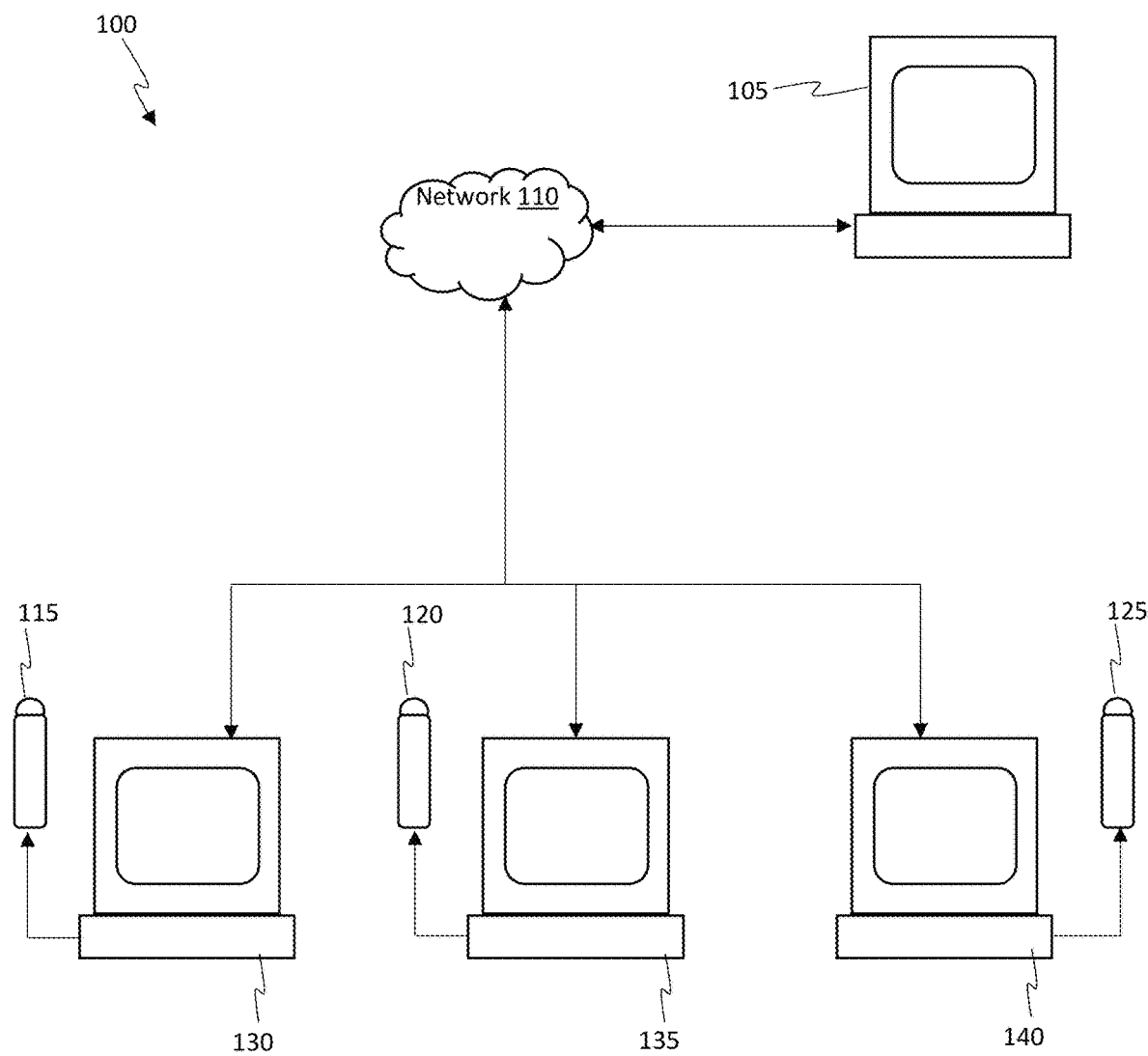
FIG. 1A depicts an exemplary computer system for automatically controlling illumination devices to indicate information associated with agents and/or workstations of a contact center according to various embodiments of the present disclosure.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of different methods. Although steps and sequencing thereof are disclosed in a figure herein describing the operations of each method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those involving physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "associating," "identifying," "encoding," "controlling," "determining," "communicating," "triggering," "initiating," "activating," "retrieving," "displaying," "utilizing," "ranking," "outputting," "receiving," "detecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

System and Method for Automatic Indication of Agent Status Using an Illumination Device Various embodiments of the present disclosure provide systems and methods for automatically controlling an electronic illumination device to indicate information pertaining to workstations or agents of a customer contact center. Some embodiments are useful in the context of employee management because the illumination devices are used to indicate information about tasks that employees are engaged in, the performance of the employees, and the status of the employees. A computer system coupled to the illumination device executes control software configured to send control signals over a communication interface, such as USB or Bluetooth. The data sent to the electronic illumination device can cause the illumination device to turn off or on, change color, blink, strobe, etc., for producing desired lighting effects representative of a real-time status or event associated with an employee or workstation. According to some embodiments, the data includes an information request sent from a supervisor computer system to agent computer system. The information request can be concerning performance or productivity metrics of an agent, the current status of the agent, the availability of a workstation, etc. By scanning across the contact center floor, the supervisor can obtain a rapid visual inspection of the types of questions, assistances, or status that are applicable to the agents on the floor.

With regard to FIG. 1A, an exemplary computer system 100 for automatically controlling electronic illumination (e.g., LED) devices 115, 120, and 125 to indicate information associated with agents and/or workstations of a contact center is depicted according to various embodiments of the present disclosure. The computer system 100 includes a supervisor computer system 105 connected to one or more agent computer systems 130, 135, and 140 over a computer network 110. Computer network 110 facilitates communication between the computer systems over a wired and/or wireless connection, and may include a local area network, a wireless network and/or the Internet. According to some embodiments, the electronic illumination devices 115, 120, and 125 can have a rod or stick shape, but are not limited to such, and may be disposed in a vertical orientation above or next to the agent computer systems 130, 135, and 140 in a fashion that the illumination devices can be visualized by a supervisor or manager on the floor of the center. It is noted that according to some embodiments, each of the electronic illumination devices 115, 120, and 125 can be implemented in any shape and any orientation such that the illumination devices can be visualized by a supervisor or manager on the floor of the center.

The agent computer systems 130, 135, and 140 can be used in a contact center for facilitating agent communications with customers and for solving customer service issues. For example, a customer can call an agent or chat with an agent to describe a customer service issue, and the agent can use their respective computer system to respond to the customer and access customer service information such as information regarding the customer's account, knowledgebases, manuals, etc. The supervisor computer system or monitor system 105 is in communication with the agent computers systems 130, 135, and 140 for interfacing with the agents and for obtaining data from the agent computer systems such as agent status, inquiry status, an agent requesting assistance ("hand raised"), and performance/productivity metrics. For example, the supervisor computer system 105 can execute software that displays a list of all agents in the contact center, including the status of the agents, such as which agents have requested help, which agents are currently being helped, performance metrics of the agents, how long an agent has been working, etc.

In one example, the agent computer system 130 causes illumination device 115 to turn a particular color (e.g., red) to indicate that the agent working at computer system 130 has requested assistance. The agent computer system 130 also sends information to supervisor computer system 105 over network 110 to indicate that the agent has requested assistance, and the request for assistance can be displayed on a graphical user interface rendered on a display device of the supervisor computer system 105. The supervisor can select or acknowledge the agent's request for assistance using the graphical user interface, and a control signal is sent from the supervisor computer system 105 to the agent computer system 130 over network 110 to cause the illumination device 115 to turn yellow, for example, to indicate that help is on the way.

Once the agent has received assistance, either the agent computer system 130 or the supervisor computer system 105 can be used to indicate that assistance is no longer required, and the illumination device 115 stops emitting light. According to some embodiments, an information request is sent from supervisor computer system 105 to agent the computer systems 130, 135, and/or 140. The information request can be concerning performance metrics of an agent, the current status of the agent, the availability of a workstation, etc. In response, real-time information is obtained from agent computer system systems 130, 135, and/or 140 to satisfy the request, and the illumination devices 115, 120, and/or 125 to turn on or change colors according to the real-time information. Based on the color and/or effect produced by the electronic illumination devices 115, 120, and/or 125, real-time status information of agents on the floor is conveniently and efficiently obtained in response to the manager viewing the illuminated electronic devices 115, 120, and/or 125 without having to access a separate device or user interface.

Figure 1B:
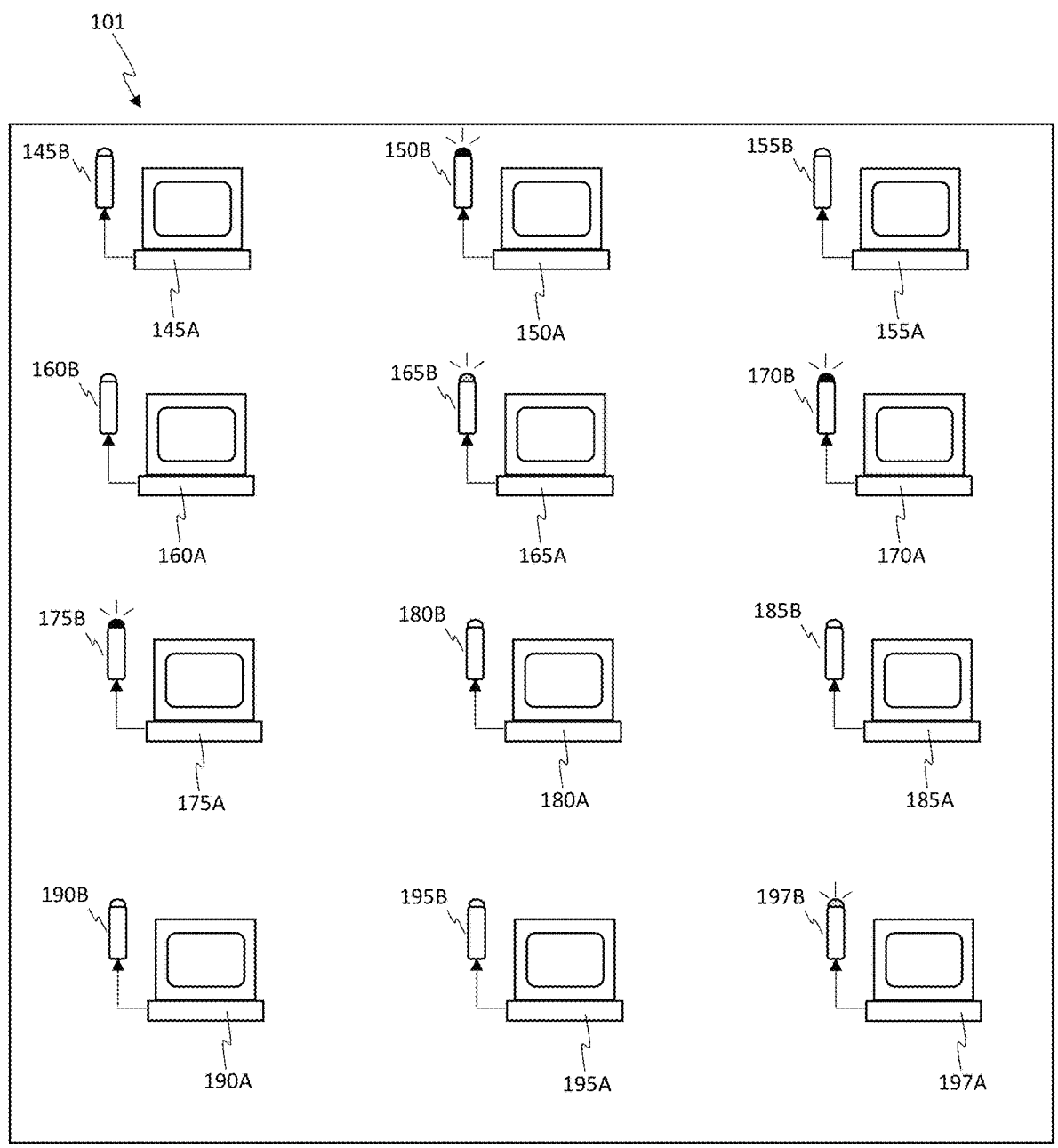
FIG. 1B depicts an exemplary customer contact center including agent computer systems in communication with respective illumination devices for conveniently indicating information to a floor supervisor according to various embodiments of the present disclosure.

With regard to FIG. 1B, an exemplary customer contact center 101 including agent computer systems 145A-197A in communication with illumination devices 145B-197B for conveniently indicating information to a floor supervisor according to embodiments of the present disclosure. The agent computer systems may be connected to a network or communication system for communicating with a supervisor system as depicted in FIG. 1A. The supervisor computer system or monitor system is in communication with the agent computers systems 145A-197A for interfacing with the agents and for obtaining data from the agent computer systems such as agent status, inquiry status, an agent requesting assistance ("hand raised"), and performance metrics.

Moreover, an information request can be sent to agent the computer systems 145A-197A, and the illumination devices 145B-197B turn on or change colors in real-time according to the criteria of the information request.

As depicted in FIG. 1B, the agent computer systems 150A, 170A, and 175A meet the criteria of an information request and therefore illumination devices 150B, 170B, and 175B illuminate using a first color or effect. For example, the supervisor computer system (e.g., 105) can issue an information request that includes illuminating the illumination devices of agent computer systems that are browsing a social media website, and illumination devices 150B, 170B, and 175B illuminate using the first color or effect to indicate that the agents using agent computer systems 150A, 170A, and 175A are browsing social media websites and therefore meet the criteria of the information request.

The agent computer systems 165A and 197A meet the criteria of a second information request and therefore illumination devices 165B and 197B illuminate using a second color or effect. For example, the supervisor computer system (e.g., 105) can issue an information request that includes illuminating the illumination devices of agent computer systems that have been idle for more than 10 minutes, and illumination devices 165B and 197B illuminate using the second color or effect to indicate that agent computer systems 165A and 197A have been idle for more than 10 minutes and therefore meet the criteria of the information request. Based on the color and/or effect produced by the electronic illumination devices 145B-197B, real-time status information across the contact center 101 is conveniently and efficiently obtained in response to the supervisor viewing the illuminated electronic devices 145B-197B without having to access a separate device or user interface. Other information requests can be based on performance/productivity metrics or thresholds, workstation status, what application is being executed by the workstation, etc.

Figure 2:
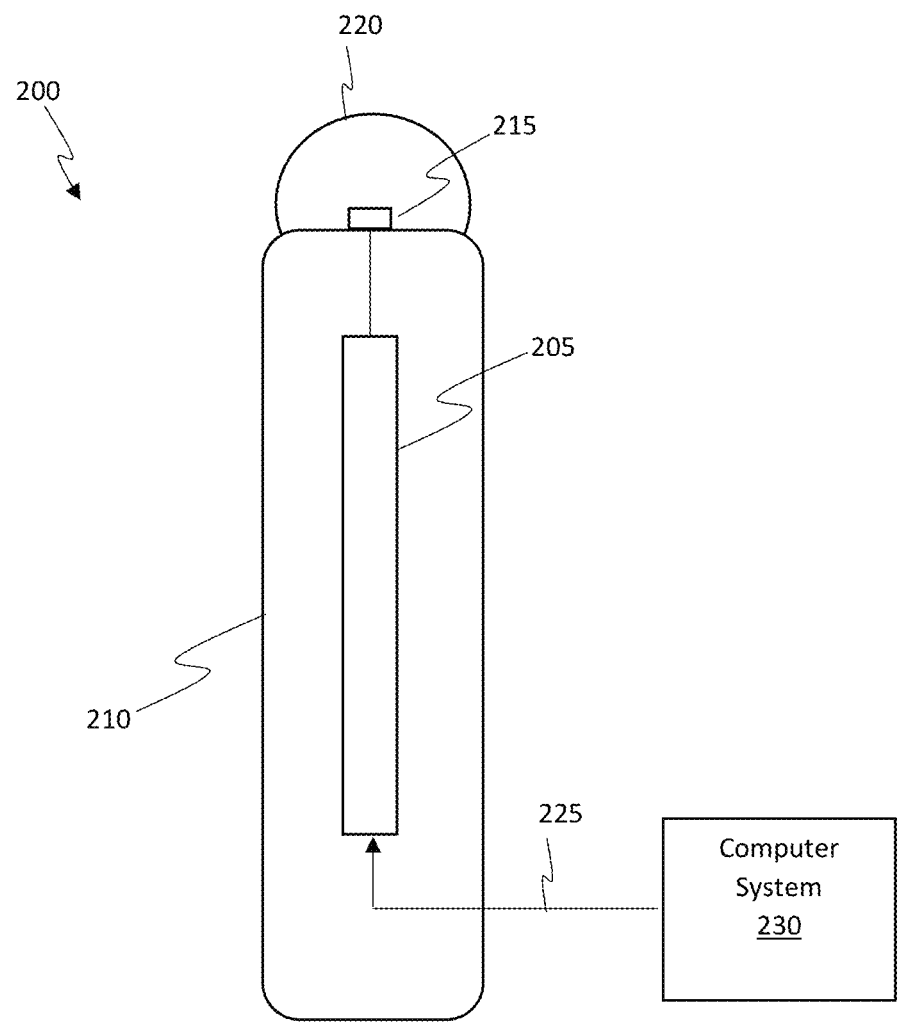
FIG. 2 depicts an exemplary electrical illumination device for emitting light to indicate the status of an agent and/or workstation of a contact center according to various embodiments of the present disclosure.

With regard to FIG. 2, an exemplary electrical illumination (e.g., LED) device 200 for emitting light to indicate the status of an agent and/or workstation of a contact center is depicted according to various embodiments of the present disclosure. The illumination device 200 includes a circuit board including circuitry 205 for controlling an illumination element (e.g., LED) 215. The circuitry 205 can control the LED 215 to selectively turn the LED 215 on and off and control the color of light emitted by the LED 215. For example, according to some embodiments the circuitry 205 can cause LED 215 to blink, strobe, display a pattern of light, emit light for a predetermined period of time, change color, change intensity, emit a color gradient (e.g., fade from red to green), etc. The circuitry 205 is disposed in a casing 210 to house and protect the circuitry 205, and includes a transparent or semi-transparent LED cover or lens 220 that can be illuminated by the LED 215 and/or diffuse the light produced by LED 215. Of course, LED is only one example of a light source and many other well-known suitable light sources can also be employed. It is pointed out that according to some embodiments, the electronic illumination device 200 and its casing 210 can be implemented in any shape and any orientation and is not in any way limited to that which is shown in FIG. 2.

The circuitry 205 is connected to a computer system 230 using a communication interface or port 225 such as USB, although any interface well-known in the art can be included, and the illumination device 200 receives power over the communication interface 225. Using communication port 225, the LED device 200 receives control signals from a computer system that causes circuitry 205 to control (e.g., activate, modify, adjust) the behavior of illumination element 215 by causing the circuit 205 to enter different operational modes. The control signals received over communication port 225 can cause the LED 215 to produce lighting effects responsive to an event or status associated with an agent or workstation of a contact center. According to some embodiments, circuitry 205 controls the behavior of illumination element 215 responsive to control signals received over communication port 225 based on predetermined thresholds, performance metrics, or more code numbers. The thresholds and metrics can be defined and customized using a monitor or supervisor computer system (e.g., 105), for example. Based on the color and/or effect produced by the electronic illumination device 200, real-time status information of the computer system 230 is conveniently and efficiently obtained in response to viewing the illuminated electronic devices 200 without having to access a separate device or user interface.

Figure 3:
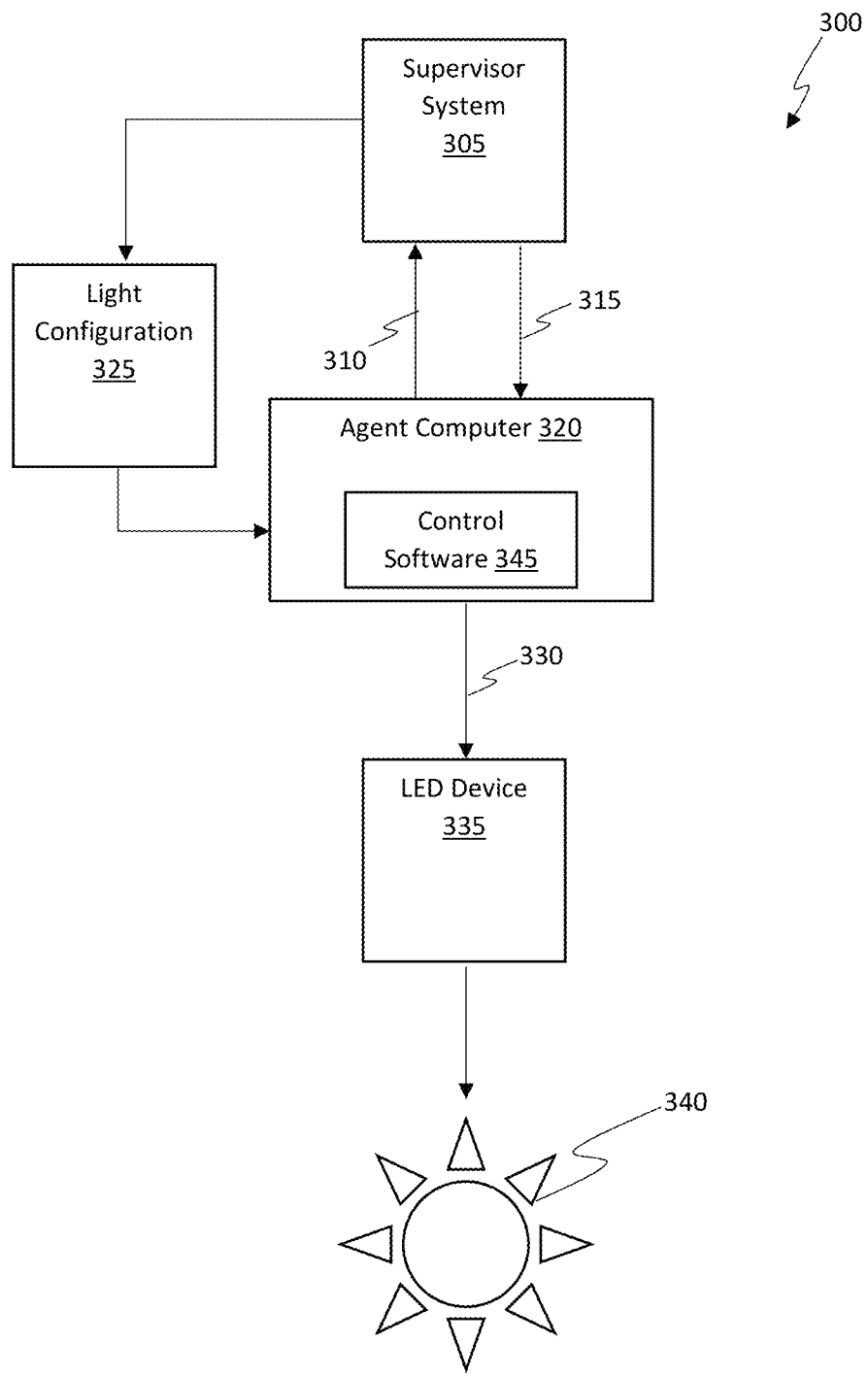
FIG. 3 depicts an exemplary block diagram and data flow diagram depicting a computer system for automatically indicating the status of an agent and/or workstation of a contact center according to various embodiments of the present disclosure.

With regard to FIG. 3, an exemplary block diagram and data flow diagram 300 of a computer system for automatically indicating the status of an agent and/or workstation of a contact center is depicted according to embodiments of the present disclosure. A supervisor computer system 305 receives data 310 from agent computer system 320 over a communication interface such as a local area network and/or the Internet. The data 310 received can include performance metrics of an agent, the current status of the agent, the status or availability of a workstation, etc. The supervisor system 305 can also send data and control signals 315 to agent computer system 320 to cause the illumination device 335 to controllably emit light 340 based on prescribed events and situations. The agent computer system 320 executes control software 345 to send control signals to illumination device 335 over a communication interface 330, such as USB or Bluetooth. The data 315 sent by the supervisor system 305 and the data 330 sent by the agent computer system 320 can cause the illumination device 335 to turn off or on, change color, change modes, blink, strobe, change brightness, etc., for producing light output 340. For example, supervisor system 305 can send data to the agent computer system 320, and the control software 345 executing on the agent computer system 320 sends corresponding control signals to the illumination device 335 for producing a desired lighting effect 340. Based on the lighting effect 340, real-time status information associated with agent computer system 320 is conveniently and efficiently obtained in response to viewing the illuminated electronic lighting effect 340 without having to access a separate device or user interface.

According to some embodiments, data 315 includes an information request sent from supervisor computer system 305 to agent computer system 320. The information request can relate to performance metrics of an agent, the current status of the agent, the availability or status of a workstation, etc. In response to the information request, real-time information is obtained from agent computer system 320 to satisfy the request. The information may include an indication of how long an agent has been logged into a computer system, what software the computer system is executing, how long the agent has been on hold, if the agent has not recently taken a break, the availability of a workstation, etc. The real-time information can be displayed on a display device connected to supervisor computer 305 and/or can be used to control illumination device 335 for causing illumination device 335 to turn off or on, change color, change brightness, change modes, blink, strobe, etc., for producing light output 340.

Figure 4:
FIG. 4 depicts an exemplary light configuration for automatically controlling an illumination device to indicate information pertaining to the status of agents and/or workstations of a contact center according to various embodiments of the present disclosure.

According to some embodiments, supervisor computer system 305 generates a memory resident light configuration file, table, or data structure 325 stored as a data structure in memory and for defining conditions which cause the illumination device 335 to emit light with pre-defined effects as depicted in table 400 (FIG. 4). Moreover, according to some embodiments, the light configuration file or table 325 can cause the illumination device 335 to emit light based on customizable conditions and customizable effects as depicted in table 500 (FIG. 5) and table 600 (FIG. 6). In one example, the light configuration file 325 is defined by the supervisor computer system 305 and causes software executed by the agent computer system 320 to control the illumination device 335 to turn blue for 10 minutes when the agent working at a station has worked for more than 4 hours without taking a break. In another example, the light configuration 325 defined by the supervisor computer system 305 causes software executed by the agent computer system 320 to instruct the illumination device 335 to blink orange for example for 2 minutes when the agent working at a station has been logged in for more than 8 hours.

According to some embodiments, the light configuration 325 includes a list of required software that agents are expected to run when working at a workstation. For example, the light configuration 325 can include criteria that indicates that the electronic illumination device 335 will emit a solid purple light for instance when all of the required software is currently being executed by an agent computer system 320. When not all of the required software is being executed by the agent computer system 320, the criteria of the light configuration 325 can indicate that the electronic illumination device 335 should produce a certain lighting effect 340. For example, the electronic illumination device 335 can blink or strobe at a speed relative to the number of required software applications that are not currently being executed. Moreover, according to some embodiments, the light configuration 325 can further include undesired software applications that will cause the electronic illumination device 335 to blink or strobe more rapidly. For example, if the agent computer system 320 is running all of the required software applications and is also running a game of solitaire, the electronic illumination device 335 will blink or strobe to indicate that an undesired application is being executed. According to some embodiments, the electronic illumination device 335 will blink or strobe more rapidly based on the number of undesired software applications currently being executed by the agent computer system 320.

With regard to FIG. 4, an exemplary light configuration data structure 400 for automatically controlling an illumination device to indicate information pertaining to the real-time status of agents and/or workstations of a contact center is depicted according to embodiments of the present disclosure. The light configuration data structure 400 is stored in memory and can include a series of entries for controlling the illumination device based on a status 405, a color 410, and/or an effect 415. The status 405 describes an event or status that triggers the illumination device to display light using color 410 and/or effect 415. Each agent computer can display the corresponding visual effect in response to a query sent by the supervisor computer for a current status of the agent.

In one example, a "hand raised" status indicates that an employee has requested assistance with a task such as satisfying a customer inquiry. When an agent requests assistance for example by selecting a "request assistance" button on a graphical user interface displayed on their workstation, the illumination device connected to their workstation will emit a solid red light for instance. When a floor supervisor acknowledges the request for assistance, for example, by selecting the agent's request for assistance on a graphical user interface, the illumination device coupled to the agent's workstation will emit a solid yellow light for instance. Thereafter, when the agent is assisted by the supervisor or assistance is no longer needed, the illumination device connected to the agent's workstation stops emitting light. In another example, when a workstation is available to be used by an agent, the illumination device connected to the workstation emits a solid green light. When the workstation becomes occupied, the illumination device stops emitting light. A blinking green light indicates that the workstation is occupied but locked by a user (e.g., during a break).

Figure 5:
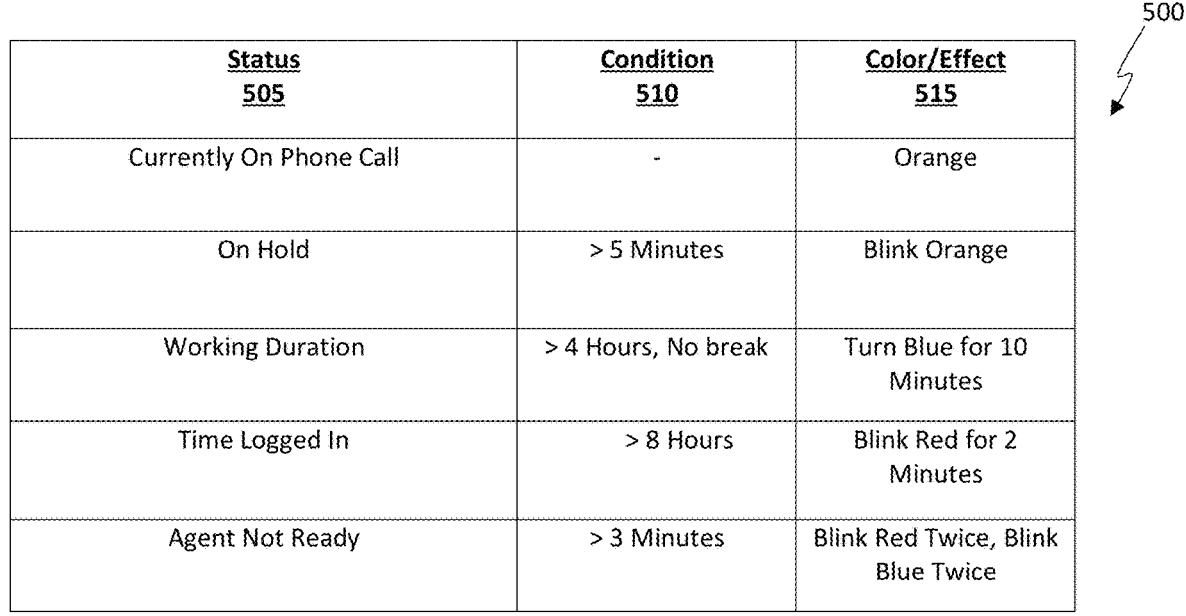
FIG. 5 depicts an exemplary light configuration for automatically controlling an illumination device to indicate information pertaining to the status of agents working at a contact center based on customizable conditions or thresholds according to various embodiments of the present disclosure.
Figure 6:
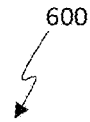
FIG. 6 depicts an exemplary light configuration for automatically controlling an illumination device to indicate information pertaining to customizable performance metrics for agents working at a contact center according to various embodiments of the present disclosure.

With regard to FIG. 5, an exemplary light configuration 500 data structure for automatically controlling an illumination device to indicate information pertaining to the status of agents working at a contact center based on customizable conditions is depicted according to embodiments of the present disclosure. The status 505 describes an event or status that triggers the illumination device to display light when customizable condition 510 is met using customizable color/effect 515. The customizable condition 510 and customizable color/effect 515 can be defined by a supervisor of the contact center and provided to workstations of the contact center for controlling illumination devices according to the light configuration 500. The condition 510 and color/effect 515 are customizable so that any threshold (e.g., time threshold, quantity threshold, performance threshold) and color or colors can be used.

In one example, the light configuration 500 causes an illumination device connected to a workstation to turn orange for instance when the agent working at the workstation is engaged in a call or chat that is currently on hold. When the agent has been on hold for more than a predetermined period of time (e.g., 5 minutes), the illumination device blinks orange for instance. As another example, the illumination device connected to a workstation will turn blue for instance for 10 minutes when the agent working at the workstation has been working for more than 4 hours without taking a break. As another example, the illumination device connected to a workstation will blink red for 2 minutes for instance when the agent working at the workstation has been logged in for more than 4 hours without taking a break. As another example, the illumination device connected to a workstation will blink red twice and then blink blue twice for instance when the agent working at the workstation has logged in to the workstation but is not yet ready to begin working. Responsive to a supervisor query sent to all agents, the agent computers will automatically display their respective visual effects to reflect their real-time status.

With regard to FIG. 6, an exemplary light configuration data structure 600 for automatically controlling an illumination device to indicate information pertaining to customizable performance metrics or thresholds for agents working at a contact center is depicted according to embodiments of the present disclosure. The status 605 describes an event or status that triggers the illumination device to display light when customizable condition 610 is met using customizable color/effect 615. The customizable condition 610 and customizable color/effect 615 can be defined by a supervisor of the contact center and provided to workstations of the contact center for controlling illumination devices according to the light configuration 600 depending on the real-time status of the workstations. The condition 610 and color/effect 615 are customizable so that any threshold (e.g., time threshold, quantity threshold, performance threshold) and color can be used.

In one example, software executed by a computer system of the contact center such as a server or supervisor computer system determines certain performance metrics related to the agents of the contact center, such as which agent has satisfied or completed the highest number of customer calls, chats, or inquiries. The software then sends a control signal to the workstation of the agent what has handled the highest number of calls to cause the illumination device connected to the agent's workstation to emit an orange strobe light, for example. As another example, the software can send a control signal to the workstation of the first agent to resolve a call at the contact center for a given day or time period to cause the illumination device connected to the agent's workstation to produce a multi-colored pattern or gradient. As another example, the software can send a control signal to the workstation of the agent with the highest customer satisfaction rating (e.g., based on customer satisfaction surveys) to cause the LED device connected to the agent's workstation to emit a blue strobe light. Based on the color and/or effect produced by the electronic illumination device, real-time status information across the contact center floor can be quickly obtained in response to viewing the illuminated electronic devices of the floor.

Figure 7:
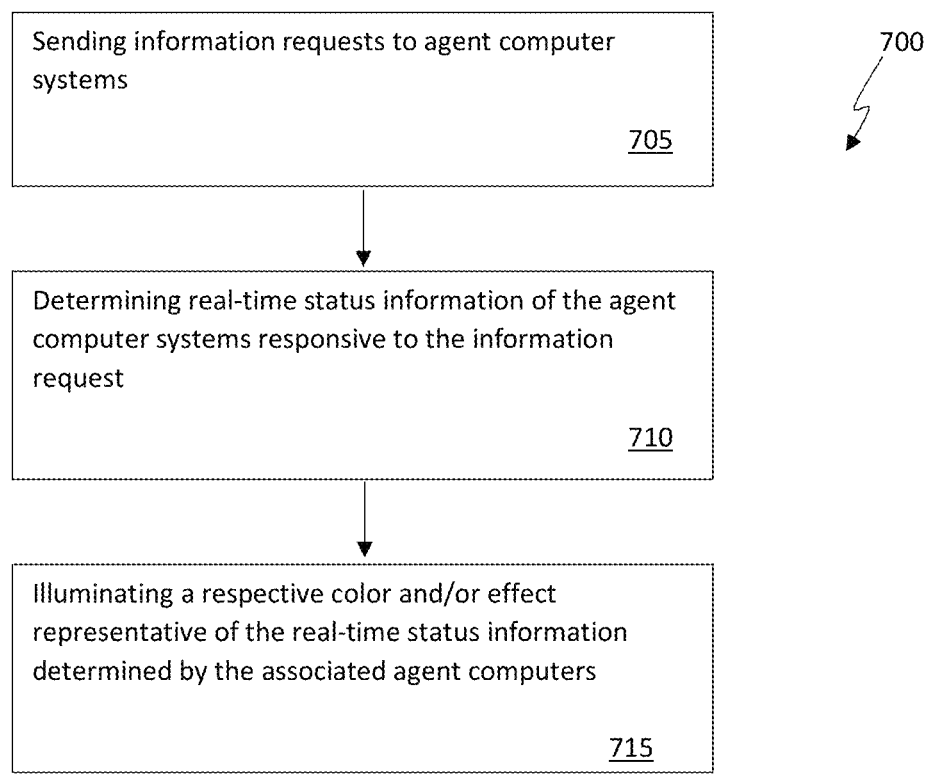
FIG. 7 depicts an exemplary sequence of computer-implemented steps for automatically controlling an illumination device to indicate real-time information (e.g., status or performance) of an agent and/or workstation of a contact center responsive to an information request or query according to various embodiments of the present disclosure.

With regard to FIG. 7, an exemplary sequence of computer-implemented steps 700 for automatically controlling an electronic illumination device to indicate real-time information (e.g., status or performance) of agents and/or workstations of a contact center responsive to an information request or query is depicted according to embodiments of the present disclosure. At step 705, an information request is sent to the agent computer systems. The information request can include, for example, a request for how long an agent has been logged into a computer system, what software the computer system is executing, how long the agent has been on hold, if the agent has recently taken a break, the availability of a workstation, performance metrics, etc. At step 710, real-time status information is determined by the agent computer systems responsive to the information request. This may include all agents of the floor or just a single agent. At step 715, a respective color and/or effect representative of the real-time status information is produced by electronic illumination devices coupled to an agent computer system or from all agent computers on the floor. Based on the color and/or effect produced by the electronic illumination devices, real-time status information across the contact center can be readily obtained by a floor manager or supervisor in response to viewing the illuminated electronic devices.

Figure 8:
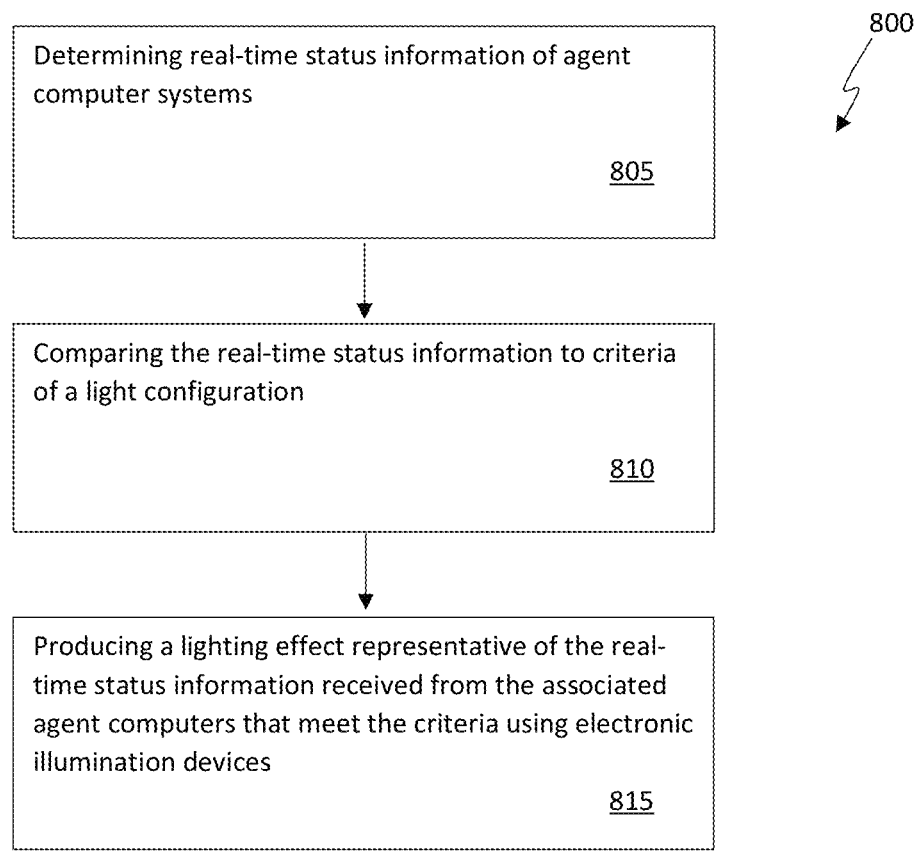
FIG. 8 depicts an exemplary sequence of computer-implemented steps for automatically controlling an illumination device to indicate that an agent of a contact center requires assistance according to various embodiments of the present disclosure.

With regard to FIG. 8, an exemplary sequence of computer-implemented steps 800 for automatically controlling an illumination device to indicate the status of an agent of a contact center is depicted according to embodiments of the present disclosure. At step 805, real-time status information is determined by an agent computer system. The real-time status can indicate real-time performance or activity information associated with the agent, or indicate that a respective agent of a contact center requires assistance (e.g., hand raised). At step 810, the real-time status information determined in step 805 is compared to the criteria of a light configuration that may be stored in memory as a file or data structure. At step 815, a respective color (e.g., red) representative of the real-time status information determined by the associated agent computer system is illuminated using an electronic illumination device according to the criteria of the light configuration file. The real-time status information (e.g., hand raised) is conveniently and efficiently obtained across the contact center in response to viewing the illuminated electronic devices without requiring access to a separate device or user interface.

According to some embodiments, a function is performed that includes providing assistance to agents requesting assistance based on the status information viewed. The function can further include selecting an agent to assist and clearing the hand raised status of the agent requesting assistance. Moreover, steps 800 can include changing the respective color (e.g., yellow) of the electronic illumination device responsive to the agent receiving assistance, or turning the electronic illumination device off.

Systems and Methods for Implementing and Using a Proximity Dashboard

Figure 9:
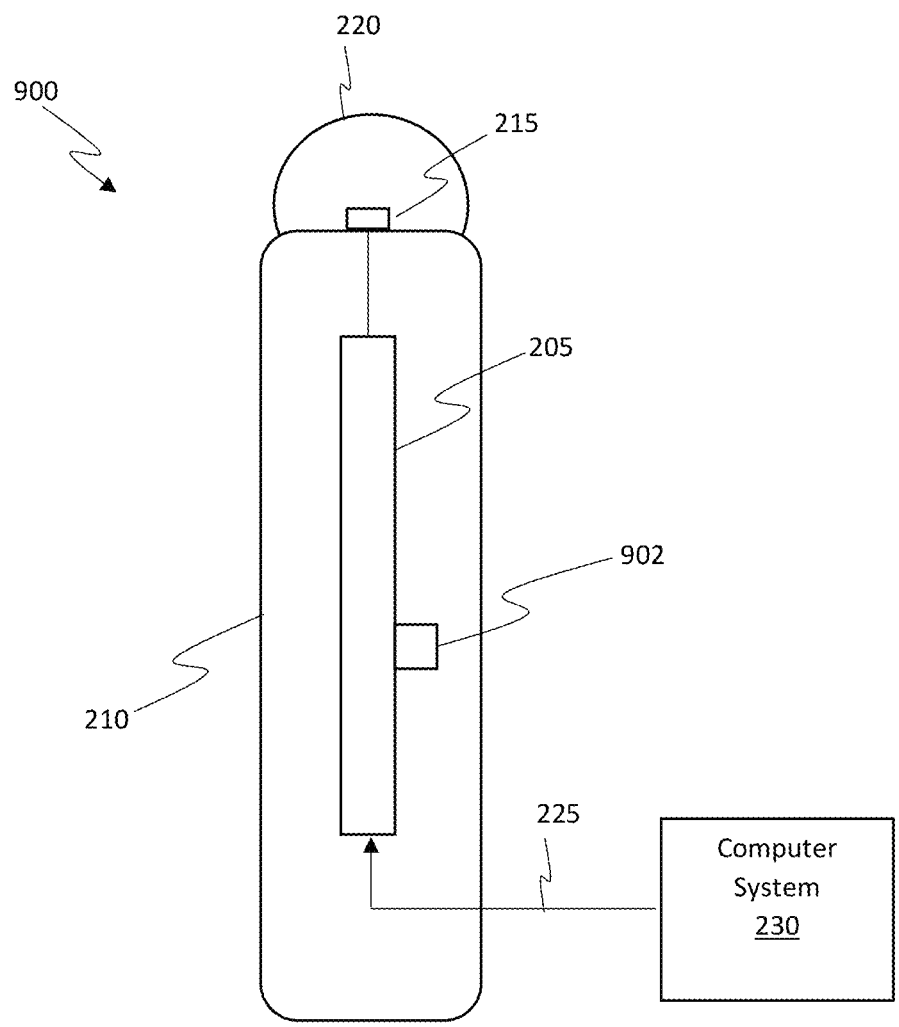
FIG. 9 depicts an exemplary electrical illumination (e.g., LED) device for emitting light to indicate the status of an agent and/or workstation of a contact center and for being proximity enabled is depicted according to various embodiments of the present disclosure.

With regard to FIG. 9, an exemplary electrical illumination (e.g., LED) device 900 for emitting light to indicate the status of an agent and/or workstation of a contact center and for being proximity enabled is depicted according to various embodiments of the present disclosure. In various embodiments, it is noted that the electrical illumination device 900 can include similar components and functionality as the electrical illumination device 200 of FIG. 2, as described and shown herein. However, the electrical illumination device 900 can also include a beacon technology system 902 that may be housed within the casing 210, but is not limited to such. In various embodiments, the beacon technology system 902 can be electrically coupled to the circuitry 205, which can be involved with the functionality of the beacon technology system 902. Note that the beacon technology system 902 can be implemented with Bluetooth Proximity Beacon technology, Bluetooth low energy beacon technology, but is not limited to such. In various embodiments, the beacon technology system 902 is operable to communicate with a beacon technology system externally located to the electronic device 900 and the beacon technology system 902 is operable to trigger an automatic process when detected. In addition, it is pointed out that in various embodiments, the electronic illumination device 900 and its casing 210 can be implemented in any shape and any orientation and is not in any way limited to that which is shown in FIG. 9. Note that in various embodiments, the electrical illumination device 900 can be implemented to replace any electrical illumination device within any system and/or contact center described and/or shown herein.

Figure 10:
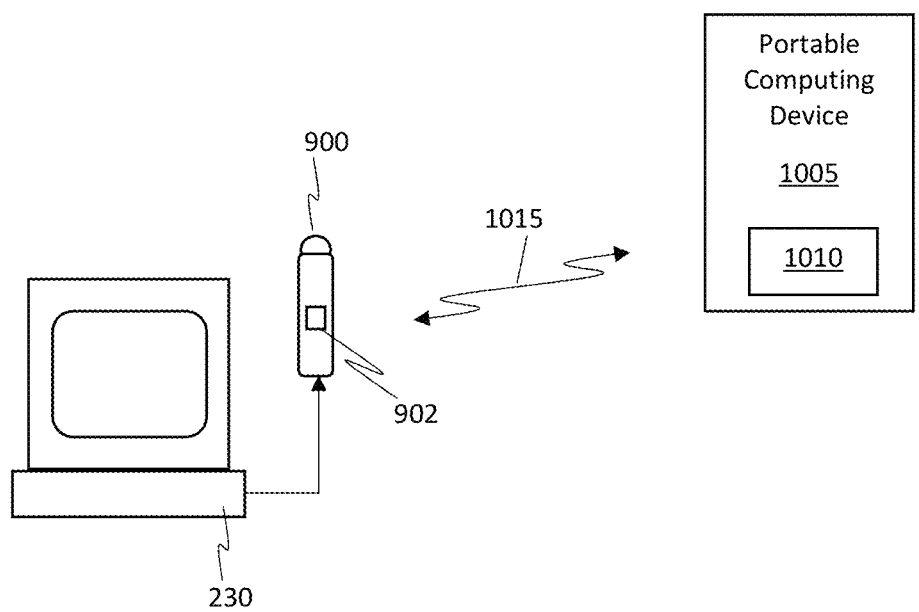
FIG. 10 depicts a system wherein the electrical illumination device can operate and function in accordance with various embodiments of the present disclosure.

FIG. 10 depicts a system 1000 wherein the electrical illumination device 900 can operate and function in accordance with various embodiments of the present disclosure. The system 1000 also includes the computer system 230 which is coupled to the electrical illumination device 900. In addition, the system 1000 includes a portable computer system or computing device 1005 that includes a beacon technology system 1010. The beacon technology system 1010 can be implemented with Bluetooth Proximity Beacon technology, Bluetooth low energy beacon technology, but is not limited to such. It is pointed out that the beacon technology system 902 of the electrical illumination device 900 and the beacon technology system 1010 of the portable computing device 1005 can wirelessly detect each other when in proximity of the other device as represented by double headed arrow 1015. Note that the portable computing device 1005 can be implemented as, but is not limited to, a tablet computing device, a smartphone computing device, a laptop computing device, and the like. Furthermore, the portable computing device 1005 can include one or more processors and one or more memory devices coupled to the one or more processors. It is pointed out that in various embodiments, when the beacon technology system 902 of the electrical illumination device 900 and the beacon technology system 1010 of the portable computing device 1005 are in proximity to detect each other, one or more automatic processes can be triggered and performed by the portable computing device 1005.

In various embodiments, in call centers the supervisors have tablets 1005 that have an interface to a management system. In a typical scenario, the supervisor works with the different agents, they walk up, they select on their tablet 1005 who they are working with, and then can run some reports, etc. on their tablet 1005. By adding these proximity beacons 902 into the existing observer light device 900 of each agent at each station of a contact center or call center, now the supervisor can walk up and the querying of that agent's information would automatically occur in the background because the tablet 1005 operating a software application in accordance with various embodiments of the present disclosure would know which agent the supervisor is working with based off their proximity. And so it would streamline the supervisor's process of the interaction (e.g., it would save them 20 or 30 seconds when they are working with an agent to pull up that data).

In various embodiments, note that the proximity beacon technology systems are leveraged of the proximity enabled tablet 1005 and the electrical illumination device 900 to dynamically display both locations, as well as identify logged in users who are within range, to display specific contact center metrics and details.

Figure 11:
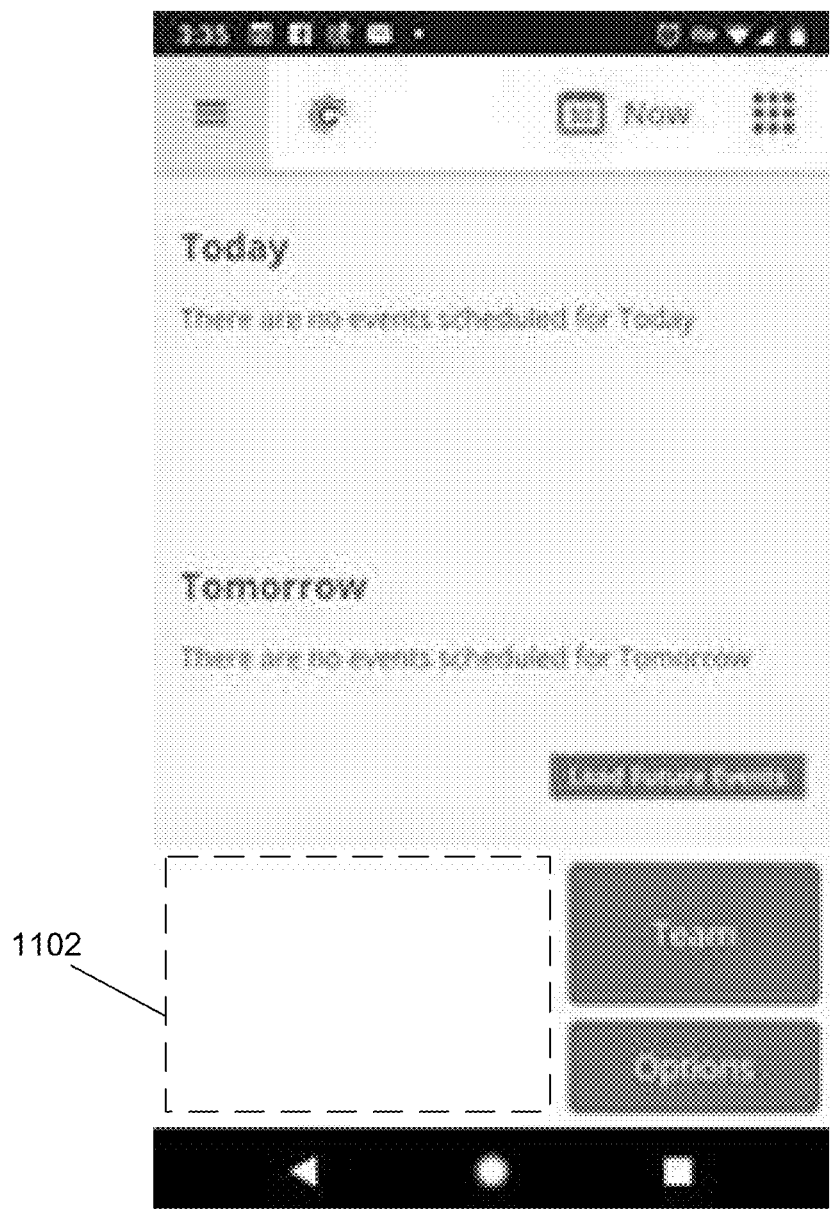
FIG. 11 illustrates a graphical user interface (e.g., proximity dashboard) that can be displayed by a mobile application operating on a Bluetooth enabled device (e.g., a tablet computing device) in accordance with various embodiments of the present disclosure.

In various embodiments, it is noted that the one or more processes that can be triggered and performed by the portable computing device 1005 is the launching of a graphical user interface (GUI) that can be used by a supervisor at a customer contact center or call center. For example, FIG. 11 illustrates a graphical user interface (e.g., proximity dashboard) 1100 that can be displayed by a mobile application operating on a Bluetooth enabled device (e.g., a tablet computing device) 1005 in accordance with various embodiments of the present disclosure. More specifically, note that GUI 1100 illustrates when a user (e.g., supervisor) of the tablet 1005 does not have any team members (e.g., agents of the contact center) online as indicated by nothing being shown within area 1102.

Figure 12:
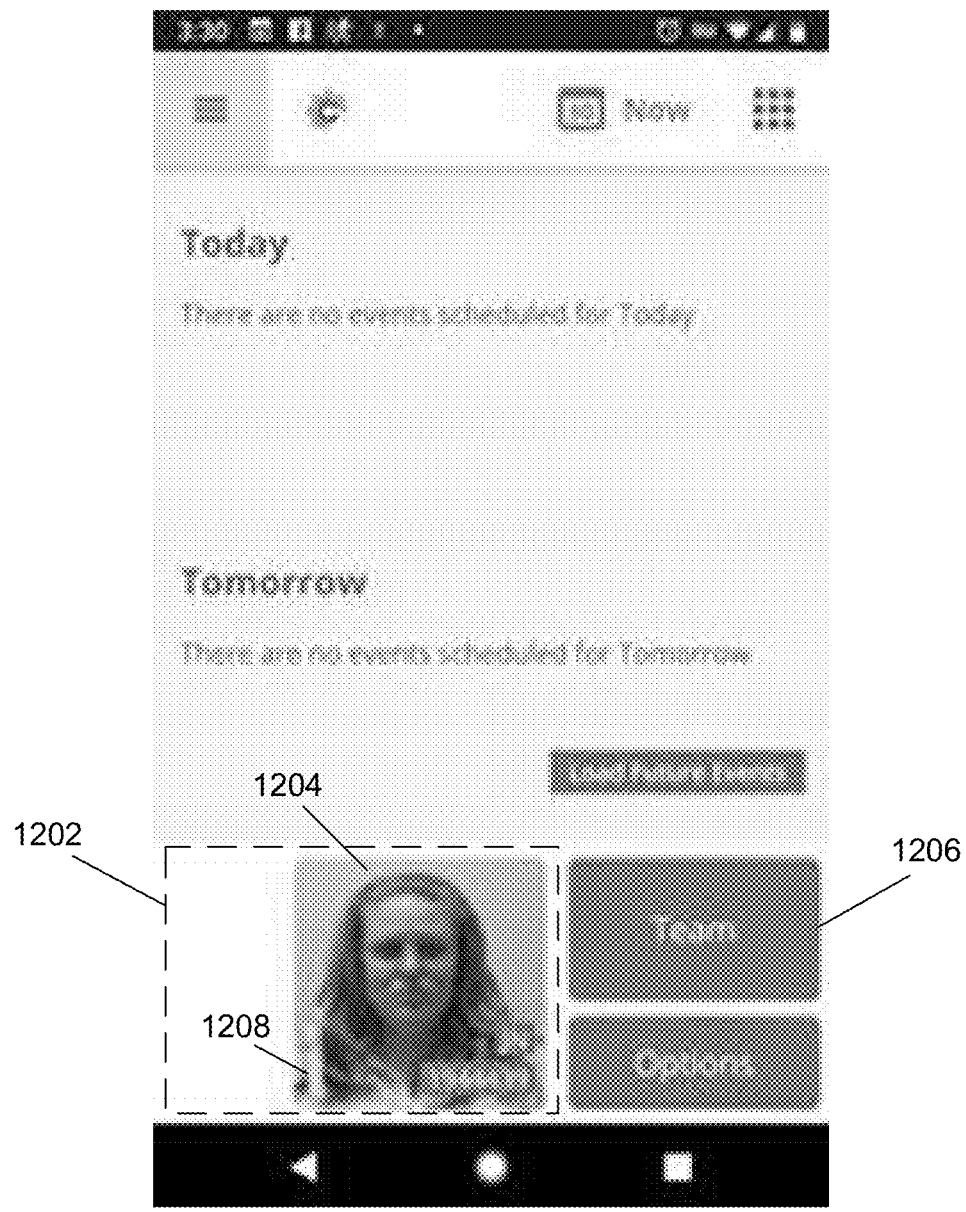
FIG. 12 illustrates the GUI (e.g., proximity dashboard) that can be displayed by the application operating on the Bluetooth enabled device once the user (e.g., supervisor) of that device is in proximity of a logged in user (e.g., team member or agent) using a computer system in accordance with various embodiments of the present disclosure.

In addition, FIG. 12 illustrates the GUI (e.g., proximity dashboard) 1200 that can be displayed by the application operating on the Bluetooth enabled device 1005 once the user (e.g., supervisor) of that device is in proximity of a logged in user (e.g., team member or agent) using computer system 230 in accordance with various embodiments of the present disclosure. Specifically, GUI 1200 can show the team member(s) and the closeness of them.

In various embodiments, via GUI 1200, an image or picture 1204 of the face of the agent is displayed within area 1202 and the supervisor will see what may be referred to as a "card." The supervisor will see a single card for each of their agents or team members, and then based off the proximity the application operating on the Bluetooth enabled device 1005 will order those cards. As an example, if there is only one agent in proximity of the portable computing device 1005, then it can auto launch information for that agent (e.g., as shown within area 1202). Note that the portable computing device 1005 would provide the information for the agents on their team automatically queried for the supervisor. Within GUI 1200, in this instance there is one person in close proximity, but if there were multiple in close proximity, then GUI 1200 would show multiple people (e.g., via an image or picture of each one of those multiple people). Note that within GUI 1200, by selecting the "Team" button 1206, the user of device 1005 (e.g., supervisor) has the ability to show a card for all of their team members regardless of proximity. It is pointed out that within the agent picture 1204 of GUI 1200 there is a vertical colored bar 1208 that shows or indicates the proximity signal strength of that agent's beacon technology system 902 of the electrical illumination device 900. The taller the vertical colored bar, the stronger the proximity signal strength. There can be an option in that Team button 1206 of GUI 1200 to show the card for every one of the supervisor's agents and then see a vertical colored bar (e.g., similar to 1208) for the ones in proximity to the supervisor's device 1005. In this manner there are at least a couple of different query options there. Note that proximity helps drive some automated processes in the background of the supervisor's device 1005 that speeds up the supervisor's interaction with their agents.

Figure 13:
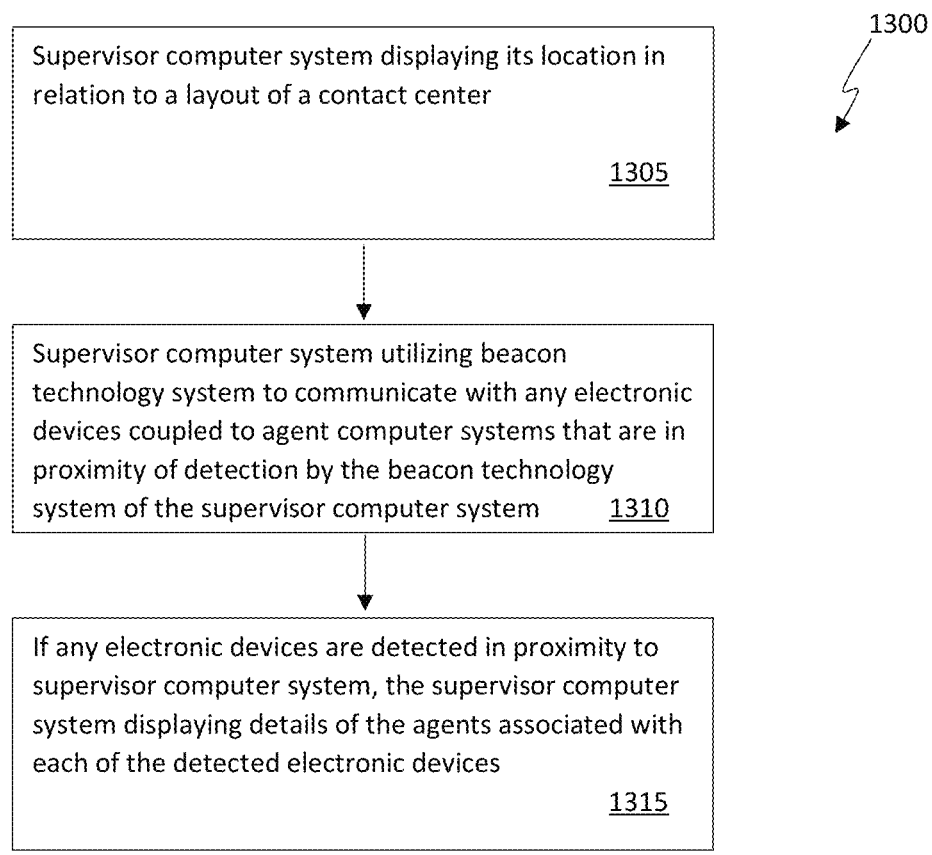
FIG. 13 is a flow diagram of a method for automatically retrieving information among a supervisor and a plurality of agents in accordance with various embodiments of the present disclosure.

FIG. 13 is a flow diagram of a method 1300 for automatically retrieving information among a supervisor and a plurality of agents in accordance with various embodiments of the present disclosure. Although specific operations are disclosed in FIG. 13, such operations are examples. The method 1300 may not include all of the operations illustrated by FIG. 13. Also, method 1300 may include various other operations and/or variations of the operations shown. Likewise, the sequence of the operations of flow diagram 1300 can be modified. It is appreciated that not all of the operations in flow diagram 1300 may be performed. In various embodiments, one or more of the operations of method 1300 can be controlled or managed by software, by firmware, by hardware or by any combination thereof, but is not limited to such. Method 1300 can include processes of various embodiments of the present disclosure which can be controlled or managed by a processor(s) and electrical components under the control of computer or computing device readable and executable instructions or code. The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium or memory (e.g., like those found within the computing system 2012 of FIG. 20).

It is pointed out that FIG. 13 will be described in combination with other figures described herein. In various embodiments, in method 1300, the supervisor is associated therewith a supervisor computer system (e.g., 1005) that includes a beacon technology system (e.g., 1010) and wherein each agent (e.g., of a contact center) has associated therewith an agent computer system (e.g., 230) and an electronic device (e.g., 900). The electronic device (e.g., 900) includes an electrical and physical interface (e.g., 225) operable to be coupled to a port of the agent computer system (e.g., 230). The agent computer system (e.g., 230) includes at least one processor. The electronic device also includes a casing (e.g., 210) housing the interface, a circuit board including circuitry (e.g., 205) housed within the casing. The circuitry receives control signals from the agent computer system over the interface and controls an illumination element (e.g., 215). The illumination element is disposed on the casing and is operable to produce a color that corresponds to a real-time status associated with the computer system. The real-time status is determined by the processor(s) and information read by the processor(s) from the agent computer system. The electronic device (e.g., 900) also includes a beacon technology system (e.g., 902) that may be housed within the casing. The beacon technology system (e.g., 902) is operable to communicate with the beacon technology system (e.g., 1010) of the supervisor computer system (e.g., 1005).

At operation 1305, the supervisor computer system (e.g., 1005) displaying its location in relation to a layout of a contact center. Note that operation 1305 can be implemented in a wide variety of ways. For example, in various embodiments the supervisor computer system can include one or more processors and one or more memory devices coupled to the one or more processors. Furthermore, in various embodiments the supervisor computer system can be implemented as a tablet computing device, a smartphone computing device, a laptop computing device, and the like. It is pointed out that operation 1305 can be implemented in any manner similar to that described and/or shown by the present disclosure, but is not limited to such.

At operation 1310 of FIG. 13, the supervisor computer system (e.g., 1005) utilizes its beacon technology system (e.g., 1010) to communicate with any electronic devices (e.g., 900) coupled to the agent computer systems (e.g., 230) that are in proximity of detection by the beacon technology system of the supervisor computer system. It is pointed out that operation 1310 can be implemented in a wide variety of ways. For example, in various embodiments, the agents, agent computer systems and associated electronic devices of method 1300 can be part of the contact center. In addition, the beacon technology system of the supervisor computer system and the beacon technology system of the electronic devices may each be implemented with Bluetooth Beacon technology, but is not limited to such. Note that operation 1310 can be implemented in any manner similar to that described and/or shown by the present disclosure, but is not limited to such.

At operation 1315, if any electronic devices (e.g., 900) are detected in proximity to the supervisor computer system (e.g., 1005), the supervisor computer system displays details of the agents associated with each of the detected electronic devices (e.g., 900). It is noted that operation 1315 can be implemented in a wide variety of ways. For example, in various embodiments the displaying of details at operation 1315 of the agents associated with each of the detected electronic devices includes ranking the agents based on proximity signal strength of their corresponding detected electronic devices. Moreover, in various embodiments the displaying of details at operation 1315 includes displaying a graphic user interface of details of the agents associated with each of the detected electronic devices. Note that operation 1315 can be implemented in any manner similar to that described and/or shown by the present disclosure, but is not limited to such.

Figure 14:
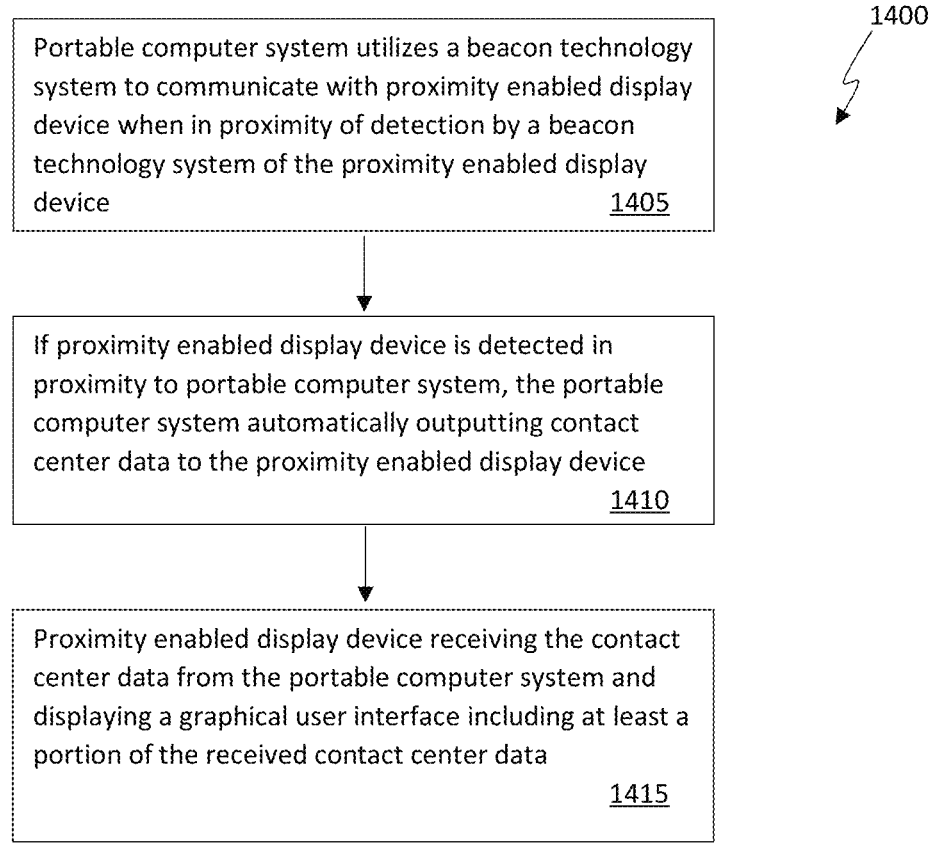
FIG. 14 is a flow diagram of a method for automatically outputting contact center data from a portable computer system to a proximity enabled display device in accordance with various embodiments of the present disclosure.

FIG. 14 is a flow diagram of a method 1400 for automatically outputting contact center data from a portable computer system to a proximity enabled display device in accordance with various embodiments of the present disclosure. Although specific operations are disclosed in FIG. 14, such operations are examples. The method 1400 may not include all of the operations illustrated by FIG. 14. Also, method 1400 may include various other operations and/or variations of the operations shown. Likewise, the sequence of the operations of flow diagram 1400 can be modified. It is appreciated that not all of the operations in flow diagram 1400 may be performed. In various embodiments, one or more of the operations of method 1400 can be controlled or managed by software, by firmware, by hardware or by any combination thereof, but is not limited to such. Method 1400 can include processes of various embodiments of the present disclosure which can be controlled or managed by a processor(s) and electrical components under the control of computer or computing device readable and executable instructions or code. The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium or memory (e.g., like those found within the computing system 2012 of FIG. 20).

Figure 15:
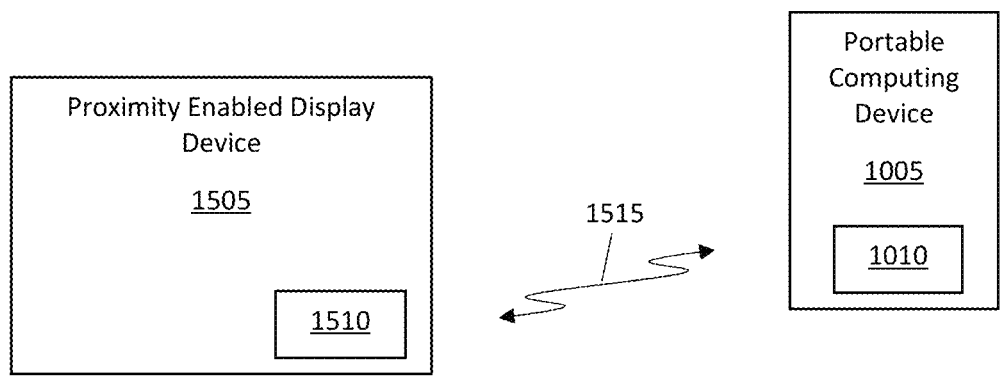
FIG. 15 depicts a system including a proximity enabled display device and a portable computer system in accordance with various embodiments of the present disclosure.

Note that FIG. 14 will be described in combination with other figures described herein, along with FIG. 15. FIG. 15 depicts a system 1500 including a proximity enabled display device 1505 and a portable computer system 1005 in accordance with various embodiments of the present disclosure. Note that each of the proximity enabled display device 1505 and the portable computer system 1005 is operable to communicate wirelessly with the other. In addition, the proximity enabled display device 1505 includes a beacon technology system 1510 while the portable computer system 1005 includes the beacon technology system 1010 (as described herein). In various embodiments, the beacon technology systems 1010 and 1510 can each be implemented with Bluetooth Proximity Beacon technology, Bluetooth low energy beacon technology, but are not limited to such. It is noted that the beacon technology system 1510 of the proximity enabled display device 1505 and the beacon technology system 1010 of the portable computing device 1005 can wirelessly detect each other when in proximity of the other device as represented by double headed arrow 1515. In various embodiments, the portable computing device 1005 can be implemented as, but is not limited to, a tablet computing device, a smartphone computing device, a laptop computing device, and the like. Moreover, the portable computing device 1005 can include one or more processors and one or more memory devices coupled to the one or more processors. In various embodiments, when the beacon technology system 1510 of the proximity enabled display device 1505 and the beacon technology system 1010 of the portable computing device 1005 are in proximity to detect each other, one or more automatic processes can be triggered and performed by the portable computing device 1005 and proximity enabled display device 1505.

In various embodiments, when a supervisor with a portable computing device 1005 walks up to a proximity enabled display interface 1505, the display 1505 will dynamically change to show specific details about the supervisor's team. The proximity enabled display interface 1505 can be used to display team performance metrics, key performance indicators, etc.

Figure 16:
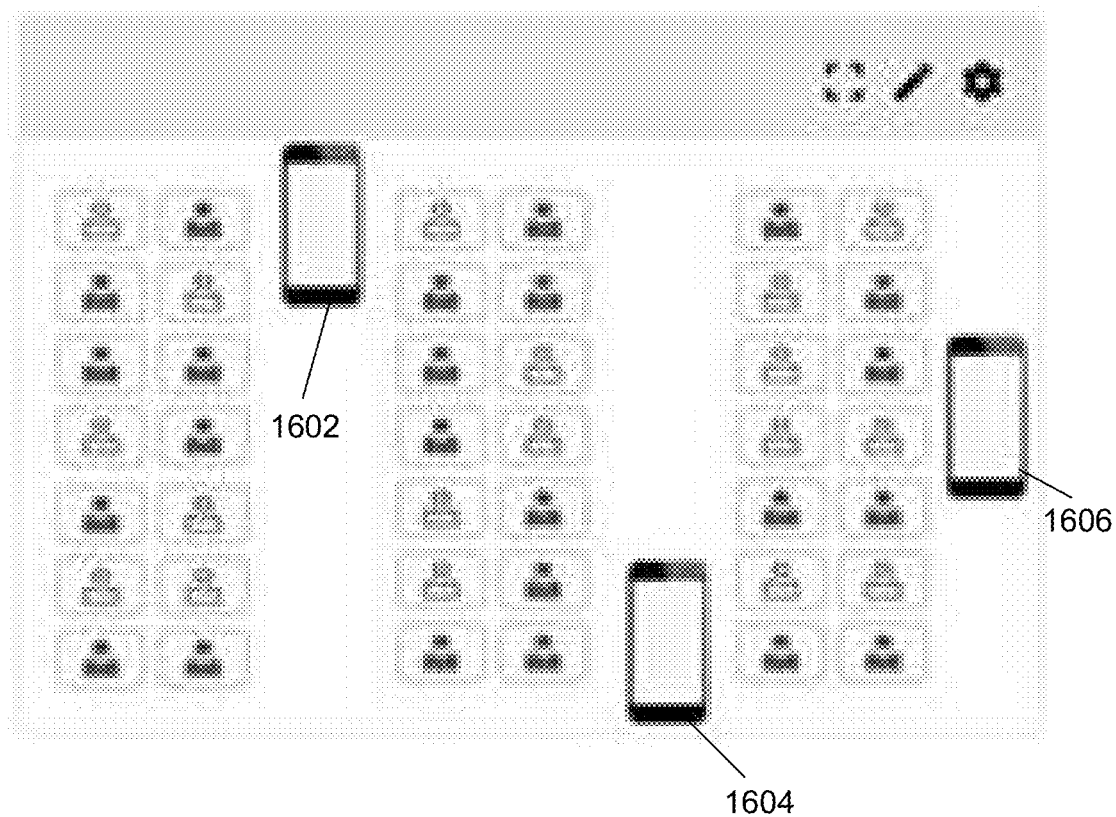
FIG. 16 illustrates a GUI of a visual display (e.g., Call Center layout) of Supervisor Proximity (e.g., each device represents a Supervisor's Current location) in accordance with various embodiments of the present disclosure.

FIG. 16 illustrates a GUI 1600 of a visual display (e.g., Call Center layout) of Supervisor Proximity (e.g., each device represents a Supervisor's Current location) in accordance with various embodiments of the present disclosure. Typically in a normal call center, white boards and/or bulletin boards can be installed and used to inform call center agents of different information. In various embodiments in accordance with the present disclosure, instead of using white boards and/or bulletin boards, a call or contact center can be made more digital by implementing the call center with one or more proximity enabled display devices 1602, 1604, and 1606 (e.g., which can each be implemented similar to proximity enabled display device 1505). Then a supervisor using a portable computer system (e.g., 1005) would be able to walk up and in proximity with one of the proximity enabled display devices (e.g., 1602, 1604, or 1606) and use the proximity dashboard for any kind of reporting of the contact center, etc. In various embodiments, the proximity dashboard is a graphical user interface that can be displayed on the portable computer system (e.g., 1005) and any of the proximity enabled display devices (e.g., 1602, 1604, and 1606). When the supervisor walks up with their tablet (e.g., 1005) to a proximity enabled display device (e.g., 1602, 1604, or 1606), the proximity dashboard displayed on the proximity enabled display device (e.g., 1602, 1604, or 1606) would give them the ability to see specific things on that dashboard and to help show it to the team members or agents in the vicinity of that proximity enabled display device. For example, maybe it is an update on the communication for product knowledge for the team that they need to make sure is repeated to each of the agents or it is a dashboard of performance where they are trying to track daily sales and they want to display a dashboard and stack rank the agents off that. Note that the proximity of the portable computer system (e.g., 1005) to a proximity enabled display devices (e.g., 1602, 1604, or 1606) is able to drive content on the dashboard which can include whatever business rules that are desirable to drive around that.

In various embodiments, a supervisor walks up with their tablet 1005 to a proximity touch screen device (e.g., 1602, 1604, or 1606) that's located on the call floor, and because of the supervisor's tablet 1005 proximity to the dashboard screen (e.g., 1602, 1604, or 1606), a dashboard of a full set of reports for the supervisor's team, a summary of the supervisor's team could be auto generated and that information be made available to the supervisor so that the supervisor is staying in close proximity to their team, but saving the supervisor time of querying the team members.

In various embodiments, the supervisors at a contact center or call center could walk up with their tablet 1005 to a proximity enable display device (e.g., 1602, 1604, or 1606) and have more dynamic content based on their proximity. In various embodiments, the proximity enable display device (e.g., 1602, 1604, or 1606) can be showing metrics for a supervisor's team members. The supervisors with their tablets 1005 in proximity to the dashboard (e.g., 1602, 1604, or 1606) could pull up information that the whole team could see in the same way that they have a white board at the end of a row of the call center. In various embodiments, call center agents are located in rows and bays, and so the supervisor has a team gathered in close proximity. So with a big enough screen of the proximity enable display device (e.g., 1602, 1604, or 1606), a supervisor with their tablet 1005 would be able to pull up the metrics and the rest of the agents would be able to see that as well.

Figure 17:
FIG. 17 illustrates a GUI of an exemplary "keep alive" waiting screen displayed by a proximity enabled display device, e.g., a large touch screen display device or television, (upon which a Proximity Dashboard operates) when all proximity enabled devices (e.g., supervisor tablet) are out of range in accordance with various embodiments of the present disclosure.
Figure 17:
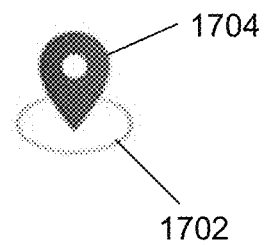

FIG. 17 illustrates a GUI of an exemplary "keep alive" waiting screen 1700 displayed by a proximity enabled display device (e.g., 1505), e.g., a large touch screen display device or television, (upon which a Proximity Dashboard operates) when all proximity enabled devices (e.g., supervisor tablet 1005) are out of range in accordance with various embodiments of the present disclosure. It is noted that when all proximity enabled devices are out of range of the proximity enabled display 1505 (upon which a Proximity Dashboard operates), the proximity enabled display device 1505 will display the keep alive waiting screen 1700. In various embodiments, GUI 1700 is showing a static image that is a default of the screen 1505 when no portable computer system (e.g., 1005) is in proximity to it. In various embodiments, a circle 1702 within the GUI 1700 can be located around the bottom of the map point 1704, and the circle 1702 can be implemented in one or more different colors to help indicate whether the system is working, whether everything is communicating correctly.

In various embodiments, if the supervisor with a portable computing device (e.g., 1005) walks up to one of the proximity enabled displays, e.g., 1505, (e.g., a large touch screen display device or television), once they are close to the proximity enabled displays 1505, the display on the proximity enabled displays 1505 will dynamically change to show the Proximity Dashboard. In various embodiments, the Proximity Dashboard can be a web interface that displays information about the supervisor's team. If the supervisor with the tablet 1005 walks out of range of the proximity enabled display 1505, then the proximity enabled display 1505 goes back to displaying a basic waiting display screen (e.g., like that shown in FIG. 17) until such time as that supervisor or another supervisor with a tablet 1005 comes into range again of the proximity enabled display 1505. Note that this is a very powerful feature for the contact center or call center.

More specifically, in various embodiments, as a supervisor walks around a contact center (or call center) with a tablet computing device (e.g., 1005), running a software interface (e.g., Proximity Dashboard) and application in accordance with various embodiment of the present disclosure, a visual display will show the location of the supervisor (e.g., within the contact center), and the supervisor will see, on the software interface (e.g., Proximity Dashboard), details of which contact center agents (e.g., their computer systems 230 having the electrical illumination device 900) are within proximity to that supervisor with the tablet 1005. Information is then displayed on the tablet 1005 based on the nearest active/online agent(s).

In addition, in various embodiments, if the supervisor walks up to a proximity enabled interface/display (e.g., 1505) with a portable computer device (e.g. 1005) running a software interface and application in accordance with various embodiment of the present disclosure, the supervisor will see team related details specific to their team displayed on the proximity enabled interface/display 1505.

Figure 18:
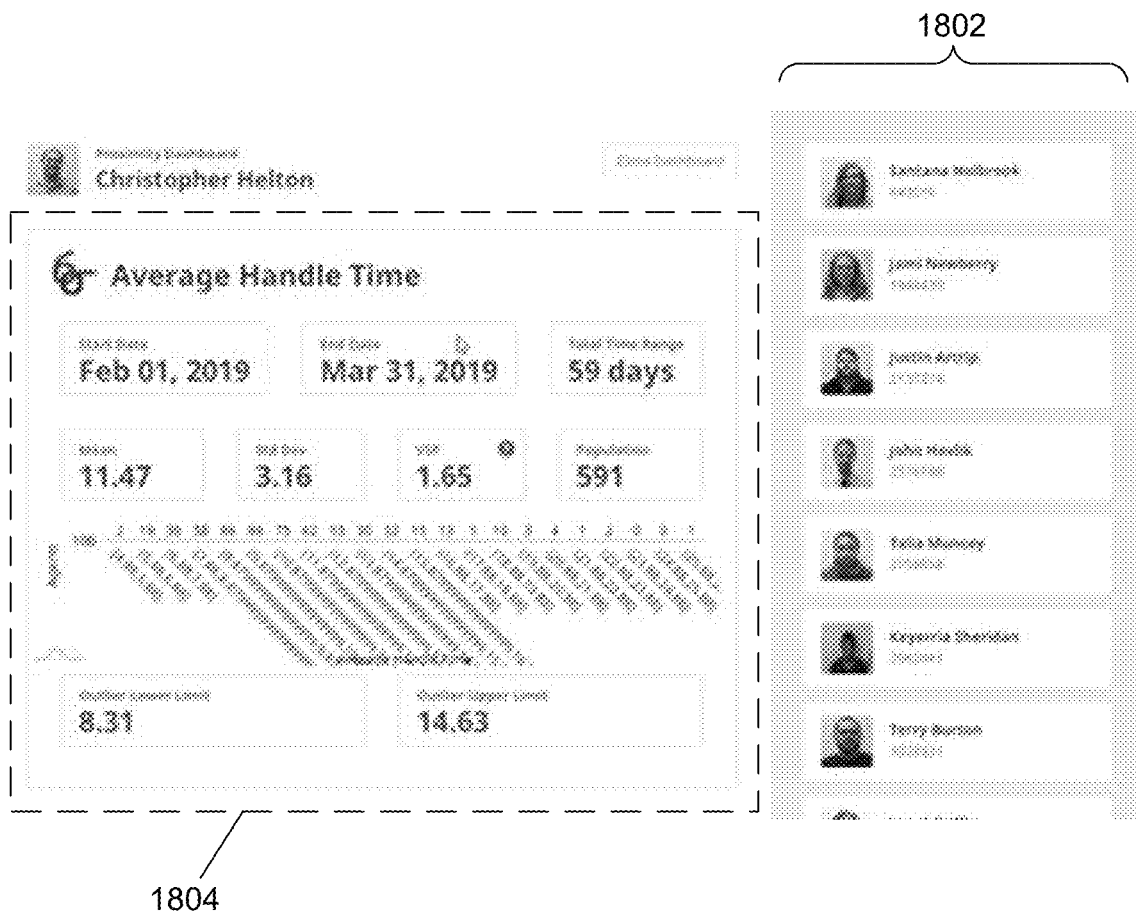
FIG. 18 illustrates a GUI of a Proximity Dashboard displayed on the proximity enabled display device when a proximity enabled device (e.g., supervisor tablet) is in range of the proximity enabled display device in accordance with various embodiments of the present disclosure.

FIG. 18 illustrates a GUI of a Proximity Dashboard 1800 displayed on the proximity enabled display device (e.g., 1505) when a proximity enabled device (e.g., supervisor tablet 1005) is in range of the proximity enabled display device in accordance with various embodiments of the present disclosure. Specifically, the Proximity Dashboard 1800 displays dynamic team content based on logged in user(s). In various embodiments, so once someone (e.g., a supervisor) with their tablet 1005 walks within range of the proximity enabled display device 1505, then the proximity enabled display device 1505 will pull up the proximity dashboard 1800, which can include a column of agent "cards" 1800 on the right side, but is not limited to such. The proximity enabled display device 1505 can be implemented as a touch screen and the proximity dashboard 1800 can show the statistics for the whole team of agents of the contact center. Note that in various embodiments the information shown within the larger area 1804 of the proximity dashboard 1800 can include information related to the team as a whole, but is not limited to such.

Figure 19:
FIG. 19 illustrates a GUI of a Proximity Dashboard displayed on the proximity enabled display device when a user (or agent or team member) is selected in accordance with various embodiments of the present disclosure.

FIG. 19 illustrates a GUI of a Proximity Dashboard 1900 displayed on the proximity enabled display device (e.g., 1505) when a user (or agent or team member) 1902 is selected in accordance with various embodiments of the present disclosure. Specifically, for example, when a team member 1902 is selected within the Proximity Dashboard 1900, the team member's specific details and information can be shown within area 1904 by the Proximity Dashboard 1900. In various embodiments, note that if a supervisor wants to drill into more information about a specific agent (e.g., 1902), the supervisor can do that by using the portable computer system 1005 to select that specific agent 1902 as shown by the highlighted agent card of the Proximity Dashboard 1900. Once selected, that information shown within the area 1904 of the Proximity Dashboard 1900 can become relevant to that specific selected agent.

Note that within FIG. 15, in various embodiments, the idea about the proximity enabled display 1505 is it is more for the content that is to be shared with all of the agents that are in proximity to the screen 1505. The supervisor can have information on their tablet 1005 that they want to share with those in proximity to the proximity dashboard display device 1505. Therefore, the supervisor is able to walk up to the proximity dashboard display device 1505 with their tablet 1005 and give everybody the ability to see it at the same time via the proximity dashboard display device 1505. Note that it is the proximity of the tablet 1005 to the proximity enabled display 1505 that drives content for the supervisor on their tablet 1005 and for the entire team on the dashboard screens (e.g., 1602, 1604, and 1606).

With reference to method 1400 of FIG. 14, at operation 1405, a portable computer system (e.g., 1005) utilizes a beacon technology system (e.g., 1010) to communicate with a proximity enabled display device (e.g., 1505) when in proximity of detection by a beacon technology system (e.g., 1510) of the proximity enabled display device. It is noted that operation 1405 can be implemented in a wide variety of ways. For example, operation 1405 can be implemented in any manner similar to that described and/or shown by the present disclosure, but is not limited to such.

At operation 1410, if the proximity enabled display device (e.g., 1505) is detected in proximity to the portable computer system (e.g., 1005), the portable computer system automatically outputs contact center data to the proximity enabled display device. Note that operation 1410 can be implemented in a wide variety of ways. For example, the contact center data can include one or more of the following: sales numbers of the contact center, sales numbers associated with one or more agents of the contact center, performance numbers associated with one or more agents of the contact center, statistics associated with one or more agents of the contact center, daily sales of one or more agents of the contact center, but is not limited to such. It is noted that operation 1410 can be implemented in any manner similar to that described and/or shown by the present disclosure, but is not limited to such.

At operation 1415 of FIG. 14, the proximity enabled display device (e.g., 1505) receives the contact center data from the portable computer system (e.g., 1005) and displays a graphical user interface including at least a portion of the received contact center data. It is pointed out that operation 1415 can be implemented in a wide variety of ways. For example, operation 1415 can be implemented in any manner similar to that described and/or shown by the present disclosure, but is not limited to such.

In various embodiments, based on the history of Supervisor data associated with the portable computer device (e.g., 1005), playback/review can be done showing where the Supervisor has gone (e.g., within the Contact Center or Call Center) and how much time was spent at each location throughout an interval of time. Note that there is the ability to track the supervisor via the portable computer device 1005 and its Bluetooth beacon 1010 and the Bluetooth beacons (e.g., 902 and/or 1510) that exist within a contact center. Therefore, there is the ability to re-create one or more supervisors activities through the day based on their proximity to all the different beacons in the contact center or call center.

In various embodiments, note that there is the ability to track all of the agents via their respective Bluetooth beacons (e.g., 902) associated with their respective computer systems (e.g., 230). Hence, there is the ability to re-create their activities through the day based on their proximity to all the different beacons in the center.

In various embodiments in accordance with the present disclosure, a portable computing device (e.g., 1005) implemented with a beacon technology system (e.g., 1010) can be utilized to provide an interface to display location, data, and metrics visually when in proximity of one or more contact center agents. Additionally, when near a display interface which is proximity enabled (e.g., 1505), the portable computing device (e.g., 1005) can provide it dynamic visualization of team information, but is not limited to such.

In various embodiments, supervisors can walk the floor of a contact center and carry a tablet device 1005. As previously noted, the electrical illumination device 900 can include the beacon technology system 902. As the supervisor walks the floor with their tablet 1005, one or more computer systems of the contact center that are communicatively coupled with each agent's computer system 230 in the contact center associated with the electrical illumination device 900 can track where the supervisor's tablet 1005 is and display that on a visual display (e.g., a television or large display device (e.g., 1505) in the contact center or call center). On the tablet 1005 the supervisor is carrying, it can then show which agents on the call floor are logged in and online so the supervisor can easily identify who is at the contact center, and who needs help. As agents on the supervisor's team login, or log out of the systems, they will dynamically show on the interface of the tablet 1005.

In various embodiments, the supervisors with tablets 1005 as they work with the different agents, will now be able to systemically track their interactions with the agents. Therefore, this provides the ability to re-map one or more supervisors' progression on the call floor, where they are spending their time just based on their proximity to those proximity beacons in each workstation of an agent.

Exemplary Computer System

Figure 20:
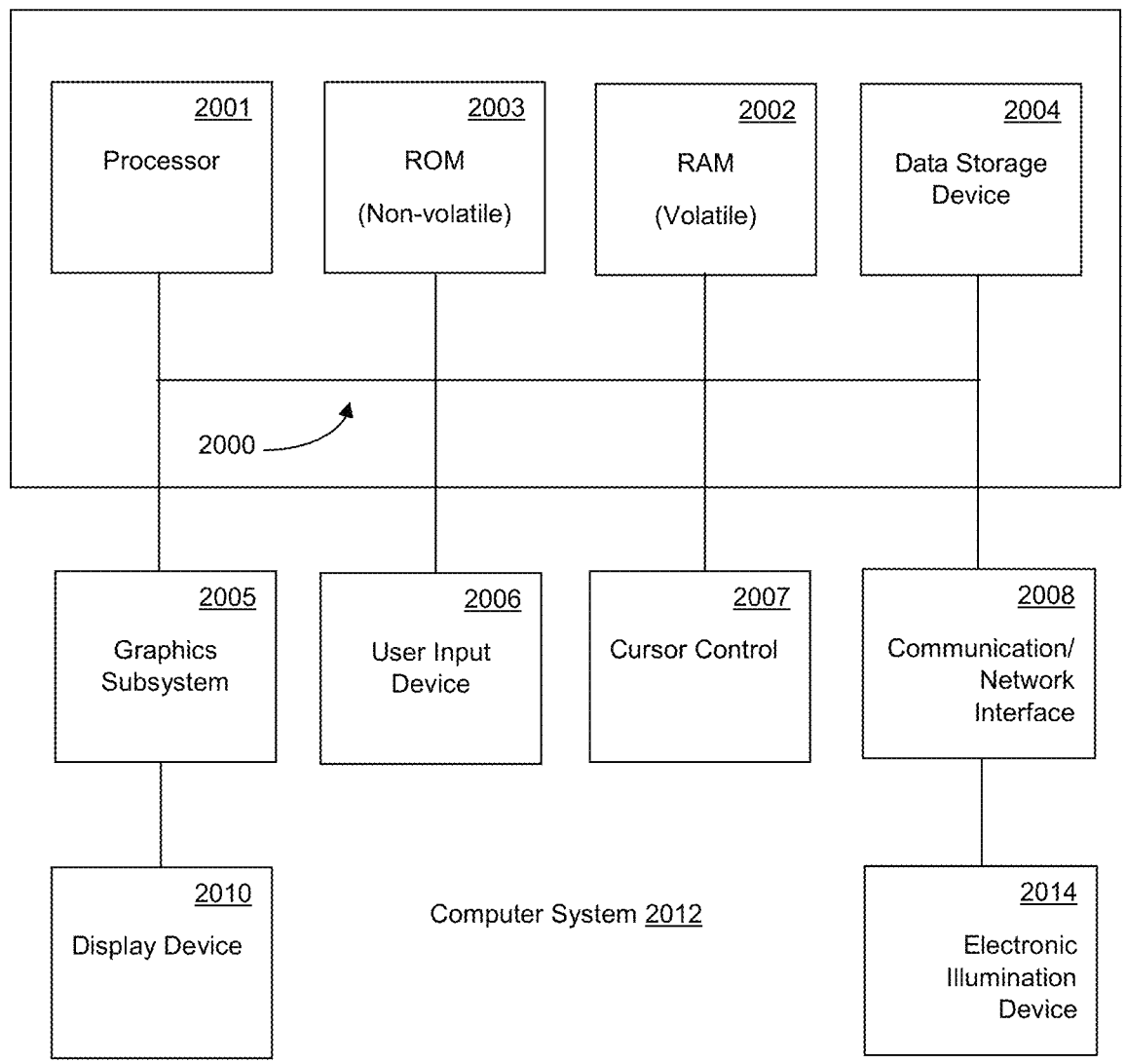
FIG. 20 depicts an exemplary computer platform upon which various embodiments of the present disclosure may be implemented.

FIG. 20 is a block diagram of an exemplary computing system 2012 that may be used in accordance with various embodiments of the present disclosure. The following discussion describes an exemplary electronic system or computer system or computing device that can be used as a platform for implementing various embodiments of the present disclosure as described and/or shown herein.

In the example of FIG. 20, the exemplary computer system 2012 (e.g., an agent system or supervisor system) includes a central processing unit (CPU) 2001 for running software applications and optionally an operating system. Random access memory 2002 and read-only memory 2003 store applications and data for use by the CPU 2001. Data storage device 2004 provides non-volatile storage for applications and data and may include fixed disk drives, removable disk drives, flash memory devices, and CD-ROM, DVD-ROM or other optical storage devices. The optional user inputs 2006 and 2007 comprise devices that communicate inputs from one or more users to the computer system 2012 (e.g., mice, joysticks, cameras, touch screens, and/or microphones).

A communication or network interface 2008 allows the computer system 2012 to communicate with other computer systems, networks, or devices via an electronic communications network, including wired and/or wireless communication such as USB or Bluetooth, and including an Intranet or the Internet (e.g., 802.11 wireless standard). The optional display device 2010 may be any device capable of displaying visual information in response to a signal from the computer system 2012 and may include a flat panel touch sensitive display, for example. The components of the computer system 2012, including the CPU 2001, memory 2002/2003, data storage 2004, user input devices 2006, and graphics subsystem 2005 may be coupled via one or more data buses 2000.

In the embodiment of FIG. 20, an optional graphics sub-system 2005 may be coupled with the data bus and the components of the computer system 2012. The graphics system may comprise a physical graphics processing unit (GPU) 2005 and graphics/video memory. GPU 2005 may include one or more rasterizers, transformation engines, and geometry engines, and generates pixel data from rendering commands to create output images. The physical GPU 2005 can be configured as multiple virtual GPUs that may be used in parallel (e.g., concurrently) by a number of applications or processes executing in parallel, or multiple physical GPUs may be used simultaneously. Graphics sub-system 2005 outputs display data to optional display device 2010. The display device 2010 may be communicatively coupled to the graphics subsystem 2005 using HDMI, DVI, DisplayPort, VGA, etc.

The communication or network interface 2008 can be used to power and/or control an electronic illumination device 2014 using the computer system 2012 and to communicate with other computer systems, networks, or devices via an electronic communications network, including wired and/or wireless communication such as USB or Bluetooth, and including an Intranet or the Internet (e.g., 802.11 wireless standard). The communication or network interface 2008 can also be used to receive and respond to information requests sent from a supervisor or monitor system, and the computer system 2012 can control the electronic illumination device 2014 responsive to the information request. Moreover, the computer system 2012 can store light configuration files or data structures in memory (e.g., RAM 2002) for defining conditions and effects used to control electronic illumination device 2014. In this way, the electronic illumination device 2014 can be advantageously used to indicate information (e.g., real-time status or activity) to a floor supervisor at a glance while the floor supervisor is monitoring the floor without having to access a separate device to view the content of graphical user interface.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Within FIG. 20, in various embodiments, computer system 2012 is well suited to be any type of computing device (e.g., smartphone, tablet computer, mobile phone, handheld computing device, laptop computer, portable computing device, server computer, desktop computer, database computer system, computer system, etc.) in accordance with various embodiments of the present disclosure. In addition, it is noted that a basic configuration of computer system 2012 can include at least one processing unit 2001 coupled with memory (e.g., random access memory 2002 and/or read-only memory 2003), but is not limited to such. Note that the computing system 2012 may not include all of the elements illustrated by FIG. 20. Furthermore, the computing system 2012 can be implemented to include one or more elements not illustrated by FIG. 20. It is pointed out that the computing system 2012 can be utilized or implemented in any manner similar to that described and/or shown by the present disclosure, but is not limited to such.

Embodiments of the present disclosure are thus described. While the present disclosure has been described in particular embodiments, it should be appreciated that the present disclosure should not be construed as limited by such embodiments, but rather construed according to the following claims.

What is claimed is:

1. An electronic device comprising:
    an electrical and physical interface operable to be coupled to a port of a computer system, wherein said computer system comprises a processor;
    a casing housing said interface, wherein said casing of said electronic device is separate from said computer system;
    a circuit board comprising circuitry housed within said casing, wherein said circuitry receives control signals from the computer system over the interface and controls an illumination element;
    the illumination element disposed on the casing and operable to produce a color that corresponds to a real-time status associated with said computer system, wherein said real-time status is determined by said processor and information read by said processor from said computer system; and
    a proximity beacon technology system housed within said casing, wherein said proximity beacon technology system operable to communicate with a second proximity beacon technology system externally located to said electronic device, said proximity beacon technology system operable to trigger an automatic process when detected;
    wherein said second proximity beacon technology system is housed within a second electronic device that performs said automatic process, wherein said second electronic device operable to display its location in relation to a layout of a contact center.

2. The electronic device of claim 1 wherein said proximity beacon technology system comprises Bluetooth Proximity Beacon technology.

3. The electronic device of claim 1 wherein said second electronic device comprising:
    a processor; and
    a memory device coupled to said processor of said second electronic device.

4. The electronic device of claim 1 wherein said second electronic device comprises a tablet computing device.

5. The electronic device of claim 1 wherein said second electronic device comprises a smartphone computing device.

6. The electronic device of claim 1 wherein said second electronic device comprises a computing device.

7. The electronic device of claim 1 wherein said real-time status represents a characteristic of an agent using said computer system.

8. A method of automatically retrieving information among a supervisor and a plurality of agents, wherein said supervisor has associated therewith a supervisor computer system comprising a proximity beacon technology system and wherein each agent has associated therewith an agent computer system and an electronic device, wherein the electronic device comprising: an electrical and physical interface operable to be coupled to a port of the agent computer system; a casing housing said interface; a circuit board comprising circuitry housed within said casing, wherein said circuitry receives control signals from the agent computer system over the interface and controls an illumination element; the illumination element disposed on the casing and operable to produce a color that corresponds to a real-time status associated with said agent computer system, wherein said real-time status is determined by a processor of said agent computer system and information read by said processor from said agent computer system; and a proximity beacon technology system housed within said casing, wherein said proximity beacon technology system operable to communicate with said proximity beacon technology system of the supervisor computer system, wherein said casing of said electronic device is separate from said agent computer system, the method comprising:
- said supervisor computer system displaying its location in relation to a layout of a contact center;
- said supervisor computer system utilizing said proximity beacon technology system to communicate with any electronic devices respectively coupled to said agent computer systems that are in proximity of detection by said proximity beacon technology system of said supervisor computer system; and
- if any electronic devices respectively are detected in proximity to said supervisor computer system, said supervisor computer system displaying details of said agents associated with each of the detected electronic devices.

9. The method of claim 8 wherein said proximity beacon technology system of said the electronic device comprises Bluetooth Proximity Beacon technology.

10. The method of claim 8 wherein said supervisor computer system comprising:
- a processor; and
- a memory device coupled to said processor of said supervisor computer system.

11. The method of claim 8 wherein said displaying details of said agents associated with each of the detected electronic devices comprises ranking said agents based on proximity signal strength of their corresponding detected electronic devices.

12. The method of claim 8 wherein said supervisor computer system comprises a tablet computing device.

13. The method of claim 8 wherein said supervisor computer system comprises a smartphone computing device.

14. The method of claim 8 wherein said displaying details comprises displaying a graphical user interface of details of said agents associated with each of the detected electronic devices respectively.

15. A method of automatically outputting contact center data from a portable computer system to a proximity enabled television, wherein said portable computer system and said proximity enabled television each comprising a proximity beacon technology system and each operable to communicate wirelessly, wherein said portable computer system comprising a processor and a memory device coupled to said processor, the method comprising:
- said portable computer system utilizing its proximity beacon technology system to communicate with said proximity enabled television when in proximity of detection by said proximity beacon technology system of said proximity enabled television; and
- if said proximity enabled television is detected in proximity to said portable computer system, said portable computer system automatically outputting said contact center data to said proximity enabled television; and
- said proximity enabled television receiving said contact center data from said portable computer system and displaying a graphical user interface comprising at least a portion of said received contact center data, wherein said contact center data comprises performance numbers associated with an agent of a contact center.

16. The method of claim 15 wherein said contact center data further comprises statistics associated with a plurality of agents an agent of said contact center.

17. The method of claim 15 wherein said contact center data further comprises sales numbers of an agent of said contact center.

18. The method of claim 15 wherein said portable computer system comprises a tablet computing device.

19. The method of claim 15 wherein said portable computer system comprises a smartphone computing device.

20. The method of claim 15 wherein said proximity beacon technology system of said proximity enabled television comprises Bluetooth Proximity Beacon technology.

* * * * *